(12) United States Patent
Weichert et al.

(10) Patent No.: US 7,571,140 B2
(45) Date of Patent: Aug. 4, 2009

(54) PAYMENT MANAGEMENT

(75) Inventors: Margaret M. Weichert, San Carlos, CA (US); John J. Mascavage, III, San Mateo, CA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1329 days.

(21) Appl. No.: 10/321,275

(22) Filed: Dec. 16, 2002

(65) Prior Publication Data

US 2004/0117302 A1 Jun. 17, 2004

(51) Int. Cl.
*G06Q 40/00* (2006.01)

(52) U.S. Cl. ............... 705/40; 705/42; 705/43; 705/26

(58) Field of Classification Search ............... 705/40, 705/42, 43, 26
See application file for complete search history.

(56) References Cited

U.S. PATENT DOCUMENTS

| | | | |
|---|---|---|---|
| 5,220,501 A | 6/1993 | Lawlor et al. |
| 5,699,528 A | 12/1997 | Hogan |
| 5,745,886 A | 4/1998 | Rosen |
| 5,826,241 A | 10/1998 | Stein et al. |
| 5,899,980 A | 5/1999 | Wilf et al. |
| 5,909,492 A | 6/1999 | Payne et al. |
| 5,915,023 A | 6/1999 | Bernstein |
| 5,920,629 A | 7/1999 | Rosen |
| 5,949,044 A | 9/1999 | Walker et al. |
| 6,012,048 A | 1/2000 | Gustin et al. |
| 6,029,150 A | 2/2000 | Kravitz |
| 6,032,133 A | 2/2000 | Hilt et al. |
| 6,088,683 A | 7/2000 | Jalili |
| 6,098,053 A | 8/2000 | Slater |
| 6,122,625 A | 9/2000 | Rosen |
| 6,131,811 A | 10/2000 | Gangi |
| 6,189,787 B1 | 2/2001 | Dorf |
| 6,202,054 B1 * | 3/2001 | Lawlor et al. .................. 705/42 |
| 6,246,996 B1 | 6/2001 | Stein et al. |

(Continued)

FOREIGN PATENT DOCUMENTS

EP 0 949 596 A2 10/1999

(Continued)

OTHER PUBLICATIONS

Kathy Kristof, Overdraft Protection can be a Bargain, Jul. 17, 1995, The Plain Dealer, p. 1C.*

(Continued)

*Primary Examiner*—James P Trammell
*Assistant Examiner*—Scott S Trotter
(74) *Attorney, Agent, or Firm*—Townsend and Townsend and Crew LLP

(57) ABSTRACT

According to the invention, a method for a payor paying a payee using a payment account is disclosed. In one step, information on a number of payment accounts is retrieved. The payment accounts comprise a first payment account and a second payment account. Selection of the first payment account is received. It is determined that the first payment account is inadequate in some respect to pay the payee. A second payment account is suggested to the payor. Which second payment account is suggested could come from the payor's and/or payee's preferences in various embodiments. The payee is paid with the second payment account.

22 Claims, 17 Drawing Sheets

U.S. PATENT DOCUMENTS

| | | |
|---|---|---|
| 6,263,446 B1 | 7/2001 | Kausik et al. |
| 6,263,447 B1 | 7/2001 | French et al. |
| 6,282,658 B2 | 8/2001 | French et al. |
| 6,321,339 B1 | 11/2001 | French et al. |
| 6,367,693 B1 | 4/2002 | Novogrod |
| 6,609,113 B1 | 8/2003 | O'Leary et al. |
| 6,950,810 B2 * | 9/2005 | Lapsley et al. ............. 705/64 |
| 6,970,853 B2 * | 11/2005 | Schutzer ................. 382/124 |
| 2002/0139849 A1 | 10/2002 | Gangi |

FOREIGN PATENT DOCUMENTS

| | | |
|---|---|---|
| EP | 1 077 436 A2 | 2/2001 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 02/05195 A1 | 1/2002 |

OTHER PUBLICATIONS

Woodene Merriman, Spendid Dish South Side Dive turns into out-of-the-way Charmer, Nov. 30, 2001, Pittsburgh Post Gazette, p. W.1.*

Mastercard International, *Secure Payment Application (SPA)*, downloaded from website http://www.mastercardintl.com.

Confinity, Inc., PayPal.com, *How PayPal.com Works*, downloaded from website http://www.paypal.com/ on Feb. 7, 2000.

Idealab Company, PayMe.com, downloaded from website http://ssl.idealab.com/ on Feb. 16, 2000.

Transpoint, *The Way to Pay Online*, downloaded from website http://www.transpoint.com/ on Feb. 10, 2000.

* cited by examiner

PAYMENT MANAGEMENT

BACKGROUND OF THE INVENTION

The invention relates generally to payment systems, and more particularly relates to transferring money between parties.

One party may wish to transfer money to herself, a counter party, or vice versa, for any of a variety of reasons. Frequently, a payor party owes a debt to a payee party or is purchasing something from a payee party. These purchases could be performed online or in-person at a point of sale (POS) terminal. A consumer typically carries a number of payment sources such as checks and cards to use in these purchases. During checkout, the consumer enters information from the check or card to allow transfer. POS terminals allow entering some of this information in an automated fashion using, for example, a check reader, a bar code reader, a magnetic stripe reader, a smart card reader, or a RFID reader.

In some cases, automated terminals gather some information from cards in an automated way. For example, airport kiosks allow entering a credit card with a magnetic stripe to read the name of the passenger to initiate a process for issuing a boarding pass. The passenger may also be able to enter this information with a keyboard.

There are electronic wallets available online to ease the checkout process. These electronic wallets store card information and demographic information that could be used to purchase items in an online checkout process. The consumer manually enters this information into the electronic which serves as a repository. Some online merchants are configured to automated pull the information from the electronic wallet needed to complete the transaction.

When paying for goods some payment accounts and/or merchants offer certain promotions. Not an exhaustive list, but some cards offer airline or other promotional points, warranty extensions, damage insurance, life insurance for travel, cash back on purchases, fraud protection, etc. Some merchants offer discounts also, such as, discounts for cash, cash back for some credit cards, delayed billing with or without interest, etc. In the case of credit cards, these promotions are detailed in term booklets that are littered with legalese typically written in small type.

BRIEF DESCRIPTION OF THE DRAWINGS

The present invention is described in conjunction with the appended figures.

Figure 1:
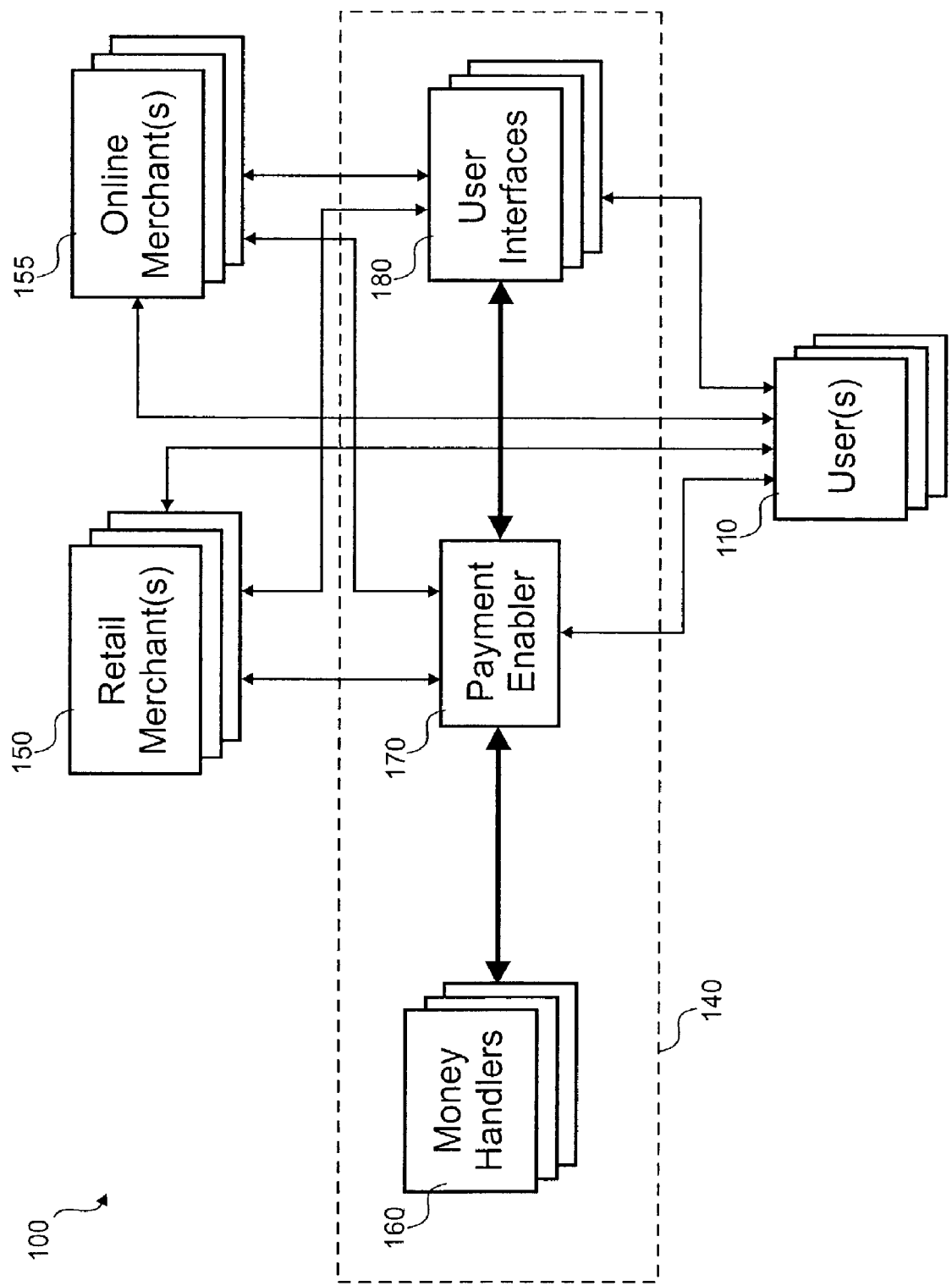
FIG. 1 is a block diagram of an embodiment of a money transfer system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a method for a payor paying a payee using a payment account. In one step, information on a number of payment accounts is retrieved. The payment accounts comprise a first payment account and a second payment account. Selection of the first payment account is received. It is determined that the first payment account is inadequate in some respect to pay the payee. A second payment account is suggested to the payor. The payee is paid with the second payment account.

In another embodiment, the present invention provides a method for a payor paying a payee using a payment account. In one step, information is retrieved on a number of payment accounts, which include the payment account. The number of payment accounts is prioritized according to an incentive. Selection of the payment account from the number of payment accounts is received. A payment is transferred from the payor to the payee with the payment account. In various embodiments, the incentive could include the account with the lowest cost of use to the payee, lowest cost of use to the payor, the largest discount, the most promotional points, the longest warranty extension, the best insurance, the best fraud protection, the lowest interest rate, and/or the longest grace period.

In yet another embodiment, the present invention provides a method for a payor paying a payee using a payment account. In one step, information is retrieved on a number of payment accounts, which include the payment account and an alternative payment account. It is determined which payment account to list first with respect to the number of payment accounts. The number of payment accounts are listed. The alternative payment account is suggested that is different from the payment account. Payment is transferred from the payor to the payee with at least one of: the number of payment accounts.

In still another embodiment, the present invention provides a payment system for a payor paying a retail merchant using a payment account. The payment system includes a payment enabler and a point of sale terminal. The payment systems is located remotely with respect to a retail merchant. The payment enabler stores a number of payment accounts for the payor. The number of payment accounts includes the payment account. The point of sale terminal is located within a retail merchant and coupled to the payment enabler. The point of sale terminal retrieves a list of the number of payment accounts. The point of sale terminal displays the list for selection of the payment account by the payor. The payment enabler transfers payment from the payor to the retail merchant with at least the payment account.

Initially referring to FIG. 1, a block diagram of an embodiment of a money transfer system 100 is shown. Included in the money transfer system 100 are retail merchants 150, online merchants 155, a payment system 140, and users 110. In a typical transaction, a user 110 is transferring payment with the payment system 140 to a retail or an online merchant 150, 155 as part of an online or in-person checkout process. Any number of users 110 can use the payment system 140 to transfer money to the various merchants 150, 155.

In this embodiment, there are both retail and online merchants 150, 155 that the user 110 can transfer money to with the payment system 140. The retail merchants 150 typically have storefronts that the user 110 visits to make a purchase. A point of sale (POS) terminal is used to manage the transfer of payment to the retail merchant 150. With online merchants 155, the user 110 interacts with an electronic interface to the online merchant 155. For example, the user 110 pulls up a screen from the online merchant 115 that allows selection of items for sale and entry of payment information.

The payment system 140 effectuates transfers between the users 110 and the merchants 150, 155. Included in the payment system 140 are a payment enabler 170, money handlers 160, and user interfaces 180. Users 110 and merchants 150, 155 primarily interface with the payment enabler 170 through the user interfaces 180 with information provided by the payment enabler 170. Once the transaction is configured for execution, the payment enabler 170 interacts with money handlers to effectuate the transfer. The payment enabler 170 tracks the transfers and allows the user 110 and merchant 150, 155 to receive status information on accounts and transfers.

The user interfaces 180 allow a multitude of ways for interaction with the payment enabler. In various embodiments, the user and merchant 110, 150, 155 can interact with a computer, a phone or a POS terminal to communicate with the payment enabler 170. The user 110 configures an account with the payment system 140, enters handler information for one or more money handlers 160, configures transfers, and gathers status information using any of the possible user interfaces 180.

The money handlers 160 are various entities that accept credits or debits on behalf of users 110 and merchants 150, 155. Typically, the account with a particular money handler 160 is created separately. For example, a merchant 150, 155 would typically have an account with a bank handler and a user 110 would have a credit card handler for purchases. In addition to accepting credits and debits, the money handlers 160 may participate in authentication, provide status information on an account, and provide clearing status for transactions.

In other embodiments, the user 110 could transfer money for any purpose to a payee in an online transaction rather than to a merchant 150, 155. Further the roles of the parties could be reverse to send money to the users 110. FIG. 1 shows interconnection between the various block, but those connections could be direct connections or virtual connections through a network. Further, the various blocks could have their functionality combined or separated in various embodiments.

Figure 2:
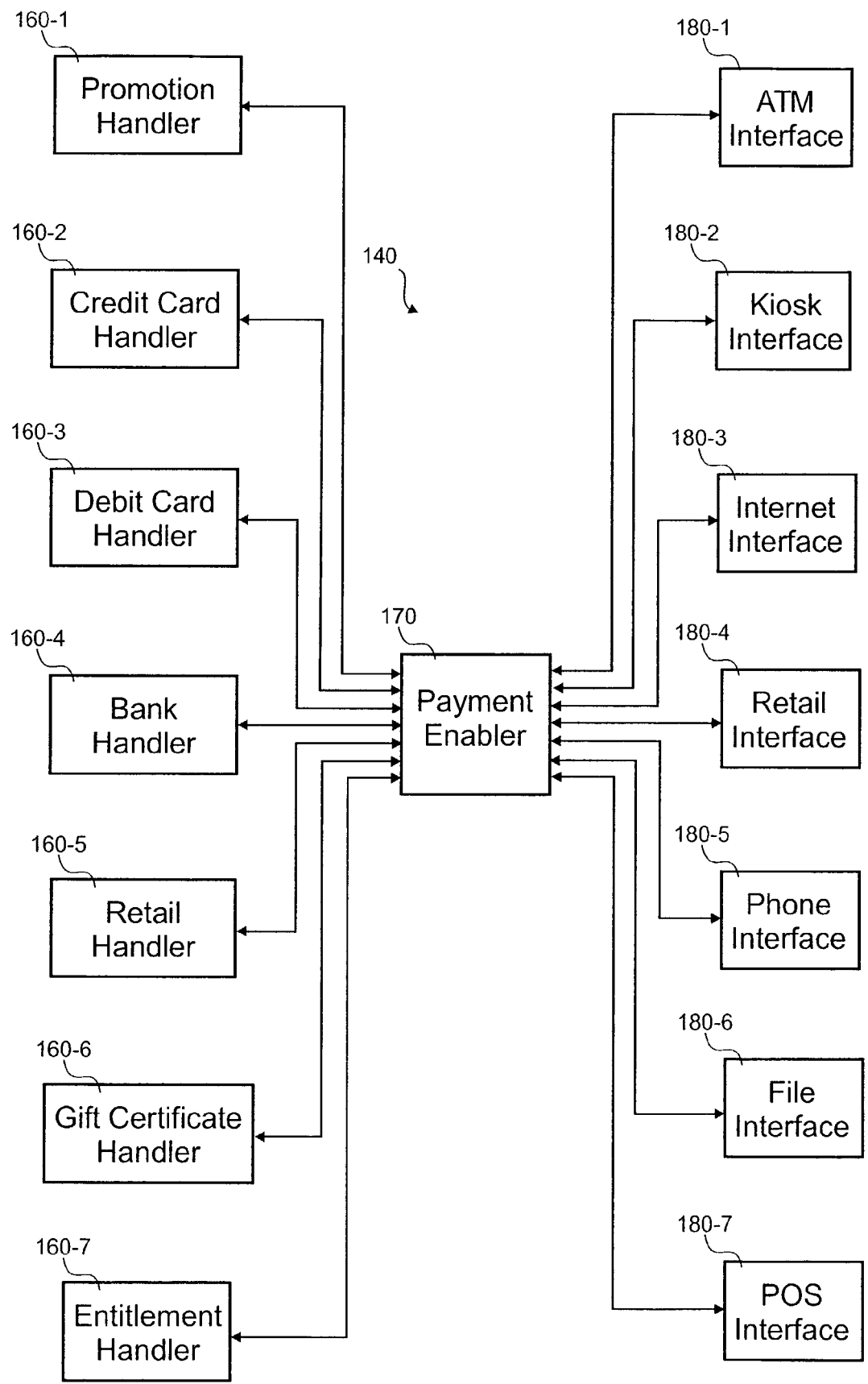
FIG. 2 is a block diagram of an embodiment of a payment system.

With reference to FIG. 2, a block diagram of an embodiment of a payment system 140 is shown. In this embodiment, seven money handlers 160 and seven user interfaces 180 are shown. Other embodiments could have more or less handlers 160 and interfaces 180. Each of the money handlers 160 allows a payor or payee 110, 130 to add and/or remove money from the payment enabler 170. Normally, the payor 110 chooses the handler 160 to fund the transaction and the payee 150, 155 chooses the handler 160 that receives the transfer. The user interfaces 180 allow a variety of interaction with the payment enabler 170 to fund a payment or to transfer money to and from a stored value fund of the payment system 140.

A promotion handler 160-1 allows adding and removing money in a form other than legal tender or a negotiable instrument. Examples of promotion handlers 160-1 include airline mileage programs and prepaid phone cards. For example, a user 110 could use money in a stored value fund of the user to purchase airline miles with an airline mileage handler 160-1 or miles could be transferred from a user 110 to a merchant 150, 155 to buy something. A conversion rate would be applied to convert between money and mileage credit. The payment enabler 170 would store any special information for interacting with the promotion handler 160-1, such as the user's promotion account number, password, etc.

Credit and debit card handlers 160-2, 160-3 largely behave the same from the perspective of the user 110 and merchant 150, 155. Both can be used to add money into the payment enabler 170 for a payment or a stored value fund. In other embodiments, these handlers 160-2, 160-3 can also be used to remove money from the payment enabler 170, for example, to purchase a prepaid credit/debit card, to pay down a balance on a credit card, or to add credit to a bank account associated with a debit card. To use the credit and debit card handlers 160-2, 160-3, the payment enabler 170 stores the information for receiving money from credit or debit cards in the conventional way, such as the account number, expiration date, name, and/or PIN. Similar information may be used when paying-out money to a credit/debit card.

There are different ways to authenticate a debit card with the debit card handler 160-3. The PIN could be stored with the payment enabler 170 for use when the user 110 satisfactorily authenticates their identity to the payment enabler 170 with another PIN, a password, biometric information, etc. The PIN could be collected from the user 110 during each checkout process and passed to the debit card handler 160-3 to verify authentication. In some embodiments, the payment enabler 170 could authenticate the user 110 and merely notify the debit card handler of that authentication for the debit to be accepted by the debit card handler 160-3.

Certain handlers 160 could have electronic benefits. For example, the ability to view account balances online or special promotions. These promotions could be discounts or promotional points. The electronic benefits could be displayed during checkout such that a user 110 could be enticed to choose this handler 160.

A bank handler 160-4 allows electronic funds transfer (EFT) of money to a bank account or brokerage account of the user 110 and/or merchant 150, 155. An account holder 110, 150, 155 of the payment enabler 170 enters the account number and routing information into the payment enabler 170 with a user interface 180 to facilitate adding and removing of money from the payment enabler 170 with this handler 160-4. In one embodiment, an automated teller machine (ATM) could incorporate the bank handler 160-4 along with an ATM interface 180-1 to allow adding and removing funds along with interfacing with the payment enabler 170. Another embodiment uses a bank handler 160-4 branch location as a retail interface 180-4 for interacting with the payment enabler 170. Some embodiments could wire money into a bank account of the account holder instead of an EFT.

A retail handler 160-5 typically corresponds to a retail location or a system of linked retail locations that may wire money, print money orders and/or cash checks. Money may be sent to the retail handler 160-5, whereafter the user 130 is issued cash or a negotiable instrument for that money. Money can be added to the system 100 by the retail handler 160-5 also. For example, the user 110 may give cash, use a card, write a check to an agent who enters a credit into the payment enabler 170. The payor 110 could further specify a payee 150, 155 to the agent who should get the money along with any information on a destination account of the payee 150, 155 that might be known to the payor 110. A retail interface 180-4 at the retail location is used by the agent to indicate to the payment enabler 170 that the money has been received from or by the user 110, 130. Through a retail handler 160-5, a payor 110 could use the money transfer system 100 without any knowledge of computers or without any debit/credit card or bank account.

Gift certificates are dispensed and redeemed with one or more gift certificate handlers 160-6. The gift certificate can be limited to merchandise and/or services from a single merchant 150, 155 or a group of merchants 150, 155. In some cases, the gift certificate is used online by entering a code unique to the gift certificate or could be printed for use with a retail merchant 150. Multi-store gift certificates such as Flooz™, formerly available from Flooz.com, could also be provided to an account holder.

An entitlement handler 160-7 can support third party payment for a percentage of purchases and/or certain types of purchases. The entitlement handler 160-7 could support programs like food stamps where certain types of products can be purchased by program participants with the government paying the merchant. In some embodiments, the entitlement handler 160-7 could pay a percentage of the items purchased. Where a product or percentage of product is not compensated by the entitlement handler 160-7, a secondary handler can be specified to pay for that product or percentage of a product. The entitlement could be a payment by government insurance programs such as Medicare or other health benefits. In some cases, the handler could be chosen for the ability of a tax refund such as using an account that is tax deductible or otherwise has favorable tax treatment.

As briefly discussed above, the ATM interface 180-1 allows interaction with the payment enabler 170. The account holder may or may not have an affiliation with the ATM that is used to interface with the payment enabler 170. Where there is no affiliation, the owner of the ATM may charge the user a fee for this service. The account holder can receive cash or deposit cash if the ATM is coupled to a bank handler 160-4. In any event, the ATM interface 180-1 can be used to interface with the payment enabler 170 in the same way an account holder may interact through a web browser and computer with the payment enabler 170. If the ATM interface has a magnetic stripe or smart card reader, this could be used by to avoid entering credit or debit card information manually for the payment enabler 170. Further a biometric scanner could be used to allow authentication of the account holder or to gather a evidentiary record of who authorized the transaction.

A kiosk interface 180-2 allows an account holder to also interact with the payment enabler 170, but does not allow adding or removing cash in this embodiment. The kiosk interface 180-2 may be a browser terminal available for general use. Some embodiments may include a check or money order printer for removing money from the system 100. Further, some kiosk interfaces 180-2 could include a card reader or a biometric reader. The kiosk interface 180-2 could be in a retail location and linked to the other systems in the retail location such that a payout could be provided by other systems in the retail location. For example, the agent could access the payment enabler 170 with a retail interface 180-3 to remove funds that are disbursed to the payee 150, 155 from a cash register.

An Internet interface 180-3 is typically implemented through a web browser or some other application software. The browser downloads web pages from the payment enabler 170. The Internet interface could be hosted by the computer of an account holder or any computer that can display web pages. Some embodiments could host the Internet interface on a portable device such as a wireless phone or personal digital assistant (PDA). The Internet interface 180-3 may also be used by the ATM, kiosk, retail, POS interfaces 180-1, 180-2, 180-4, 180-7 in whole or in part. The Internet interface 180-3 uses encryption for the link to the payment enabler 170 in some embodiments. Other embodiments may not have a web interface, using application software instead to interact with the payment enabler 170.

The retail interface 180-4 allows for specialized interaction by an agent at the retail location 125. Agents typically have special training and offer enhanced services over most interfaces 180 and handlers 160. The agent can move money between payors 110 and payees 150, 155. Also, the agent can pay-in and pay-out money from the online transfer system 100 or configure transfers between account holders. Files from removable media can be read into the system by the agent using the file interface 180-6. The retail interface 180-4 allows an agent to act on behalf of an account holder when manipulating his or her account. For security, the password or PIN of the account may be entered by the account holder during this manipulation on a private keypad or terminal. Further, the agent may verify the identity of the payee 150, 155 before disbursing the funds. In one embodiment, a test question is provided by the payor 110 that the payee 150, 155 must answer before the electronic gift is paid-out. Alternatively, the payee 150, 155 could confirm some not easily discernable information such as the maiden name of someone, a place of birth, a social security number, etc. A biometric reader could be also used on the payee 150, 155.

Interaction with the payment enabler 170 may also be performed over a telephone interfaced to the plain-old telephone system (POTS). The phone interface 180-5 provides voice prompts and recognizes the user's touch-tone or speech recognized input. Enhanced interaction with the phone interface 180-5 could be provided with wireless phones, smart phones or VOIP phones having wireless access protocol (WAP) and/or graphical user interfaces (GUIs).

The payment enabler 170 can receive and send files that list information related one or more transfers. These files are transferred from the various account holders in a secure manner that authenticates the sender and prevents unauthorized modification. The files could be transferred using standard file transfer protocol (FTP) protected by secure sockets layer (SSL) or other ways. The received files could initiate transfers or request status of existing transfers. The sent files could provide status information on transfers.

A POS interface 180-7 is used with retail merchants 150 as part of the checkout process. This interface 180-7 connects to the payment enabler 170 who formulates screens that the user 110 can interact with. In a typical situation, the user 110 would wait in a checkout line before a clerk determines what is owed for the selected items. A POS terminal could read a smart card, magnetic stripe, check, bar code, RFID tag or other machine readable medium to accept credit and debit cards and checks. This POS terminal could have a screen that provides instructions and confirms entries. In some cases, an existing machine readable medium registered with the payment enabler 170 or that includes information on the user could be read to ease access to the payment enabler 170 as a keyboard is typically not available, but could be available in some embodiments. Further, the POS terminal could include one or more biometric readers to determine or verify the identity of the user 110 or to store biometric information if there is a question as to the true identity of the user 110.

Figure 3:
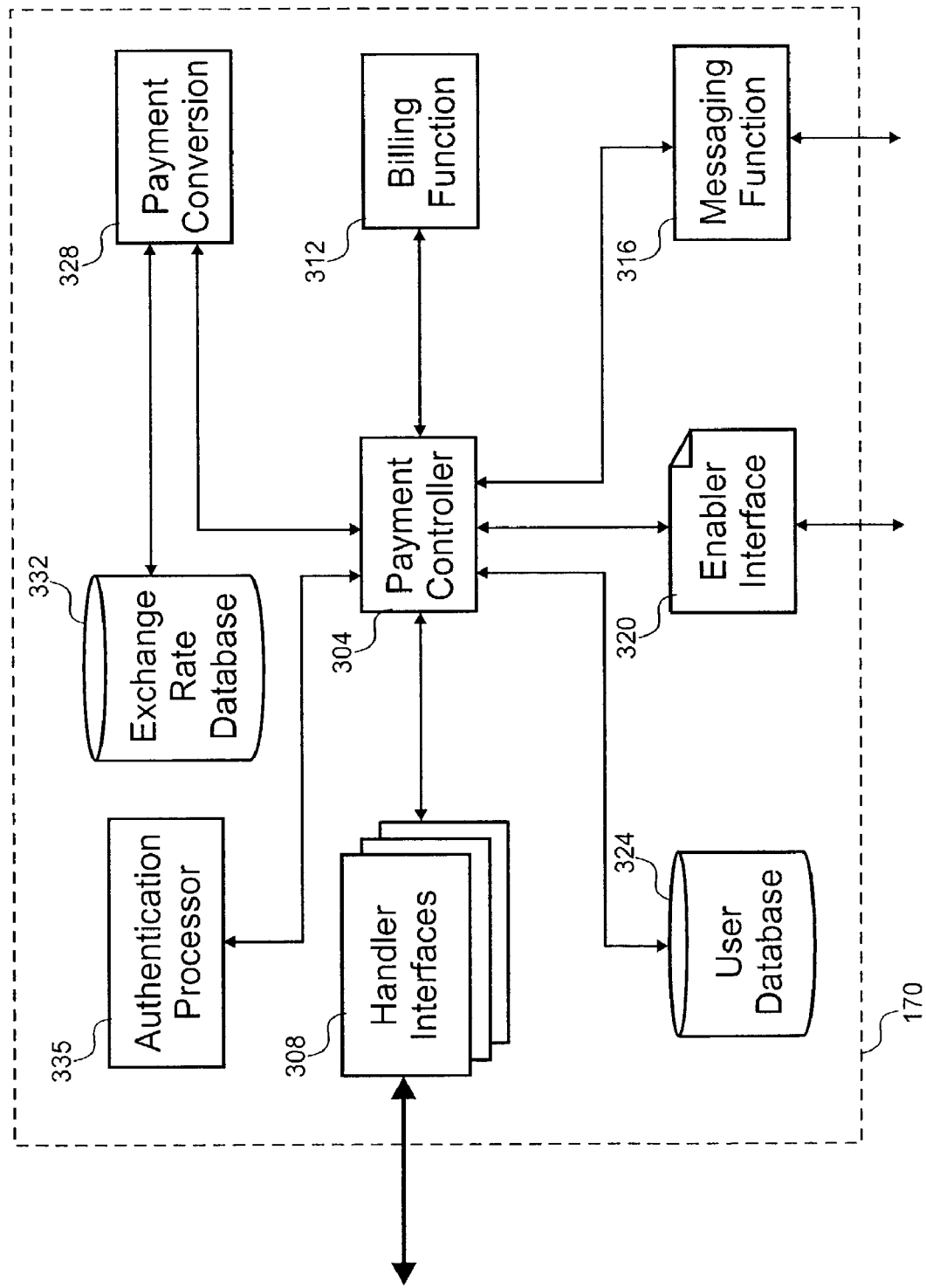
FIG. 3 is a block diagram of an embodiment of a payment enabler.

Referring to FIG. 3, a block diagram of an embodiment of a payment enabler 170 is shown. The transfer of money between handlers 160, stored value funds and account holders 110, 150, 155 is controlled by the payment enabler 170 in this embodiment. The payment enabler 170 may be implemented on one or more computers in one or more locations where the various computers would communicate over a network of some sort. Included in the payment enabler 170 are a payment controller 304, handler interfaces 308, a billing function 312, a messaging function 316, an enabler interface 320, a user database 324, a payment conversion function 328, an exchange rate database 332, and an authentication processor 335.

The payment controller 304 manages operation of the payment enabler 170. The handlers 160 and interfaces 180 along with account holder information and money conversion tasks are all choreographed by the payment controller 304. Authorization of a transfer and authentication of an account holder are performed and recorded under the guidance of the payment controller 304. The payment controller 304 is interconnected to the other portions of the payment enabler 170 by one or more networks.

The payment conversion function 328 allows converting between disparate forms of money as it is transferred through the money transfer system 100. An exchange rate database 332 holds conversion factors that allow determining the proper weight to give one form of money with respect to the others. In one example, the payment conversion function 328 may convert money in U.S. dollars to money in European Union Euros. In another example, a user may convert money into airline miles of eight miles for every dollar for a promotion handler 160-1. The exchange rate database 332 is updated with conversion rates as often as practical to track changes in currency values. The conversion rate may accommodate a percentage service fee for the exchange, or a flat fee could be charged instead of a conversion rate. In some embodiments, the conversion rate incorporates a service fee.

The billing function 312 monitors and charges for the services of the payment enabler 170. There may be charges when transferring money, converting money, redirecting a transfer, opening accounts, using customer service, sending electronic gifts, printing and mailing negotiable instruments, using kiosks, ATMs or retail locations, etc. These charges are deducted from a transfer in this embodiment, but other embodiments could charge monthly fees or charge a fee to the payor 110 and/or payee 150, 155 in addition to the amount transferred. Some embodiments could recover a fee from the handler 160, for example, a fee could be charged to the gift certificate target store instead of charging the payor 110. The different types of handlers 160 may have different fees associated with them. For example, a credit card may have a three percent charge, but a bank transfer may only have a one percent charge. The payor 110 and/or the payee 130 can be charged to transfer money between themselves. The transfer in or out of the system 100 may incur a separate charge. The billing function 312 may issue, or otherwise make available, invoices for some account holders 110, 150, 155.

The billing function 312 also tracks the costs, discount and promotions available from the money handlers 160. The user 110 and/or merchants 150, 155 can prioritize the order at which various handler accounts are presented. Conflicting preferences may be resolved in favor of either the user 110 or merchant 150, 155 in various embodiments. In some cases, the presentment of some options are completely eliminated. For example, a particular merchant 150, 155 may accept payment from the payment enabler 170 so long as a credit card handler 160-2 is not used such that the option of using a credit card is not presented to the user 110 during checkout.

Some money handlers 160 and merchants 150, 155 have certain promotions associated with use of their accounts. The billing function 312 has information on these promotions which could be compiled by the payment enabler 170 and/or provided by the merchants 150, 155 and handlers 160. Whenever a user 110 selects a handler account during checkout, the relevant merchant promotions and handler promotions are presented. The user 110 can add notes for a particular merchant 150, 155 and/or handler 160 that are stored in the user database 324 for presentment during checkout as a reminder of why a particular handler should or should not be used in the particular context.

There are handler interfaces 308 to support the various types of handlers 160. Each of these interfaces 308 may support a single handler 160 or a group of handlers. For example, a single interface 308 may perform EFT both to and from all bank handlers 160. When money is sent to or received from a handler 160, the appropriate handler interface 308 passes the money and transfer information to the payment controller 304. In some embodiments, the cost of the transfer to or from the handler 160 is reported by the handler interface 308 such that the billing function can recover those costs. The handler could gather promotional information in some embodiments for use by the billing function 312. The promotions in some cases could change often. To keep information current, the handler interface 308 could refresh the promotion information periodically or each time a particular handler is considered for use in a payment.

Information for the account holders of the system 100 is stored in the user database 324. This information includes an address book of other account holders, money credit in any stored value fund of the account holder, past money transfer information, account number, e-mail addresses, demographic information, handler interface information, handler preference information, etc. In this embodiment, the demographic information includes name, address, phone number(s), a government issued identification number such as a social security number, and other information. Any money credit not transferred out of the system 100 is stored in a stored value account or a trust account for the benefit of the user according to the entry in the user database 324 corresponding to that user and interest may or may not be paid on that money credit.

The enabler interface 320 is used by the various interfaces 180 to interact with an account holder or their agent. The enabler interface 320 allows the user 110, 130 to create and maintain their account, transfer money, configure handlers, and learn to use the system 100. The appropriate user interface 180 formats and processes the enabler interface information according to the device used to interface with the payment enabler 170. In other words, the various handler interfaces 180 interact with the enabler interface 320 to translate information suitable for the particular handler interface 180. For example, the enabler interfaces may want certain demographic information to create an account that the phone interface 180-5 would convert to verbal questions. In another example, the Internet interface 180-3 takes the information from the enabler interface 320 and formats into hypertext mark-up language (HTML) appropriate for the web browser of the account holder 110, 150, 155.

A messaging function 316 is used with some configurations to notify the account holders 110, 150, 155 of certain events. Status, acknowledgment and billing messages are sent by the messaging function 316. For example, a transfer not clearing could be sent to the payor 110 such that another payment option could be used to fund the transfer. These messages could be accessed using a web browser, an e-mail program, an instant messaging program, a voice mail system, a pager, a WAP enabled device, etc. In some embodiments, the messaging function 316 may issue printed bills and statements for users 110, 130. The messaging function 316 is also used to communicate with retail locations in various embodiments.

The authentication processor 335 is involved in verifying the identity of the account holder 110, 150, 155. Authentication may be performed to varying degrees, which generally corresponds to a fraud risk. In one embodiment, only the likely possession of the card is verified for authentication. For various online embodiments, authentication may include confirming a CCV2 code printed on the card, reading biometric information, user name and password, comparison to fraud profiles or other algorithmic methods, test questions or requests for obscure information, etc. For retail checkouts, the forgoing authentication methods could be also include scanning the card, negotiable instrument or a government identity card, a clerk or the authentication processor could verify a signature, a clerk verifying the government identity card, etc. The authentication processor 335 has access to stored information in the user database 324 for each account holder along with other information available from the money handlers 160 and other merchants 150, 155 to allow verification information during checkout. Risk of fraud could be scored for each transaction such that a merchant 150, 155 could screen out risky transactions or to allow a varying fee to be applied that reflects varying insurance costs for the fraud risk.

Figure 4:
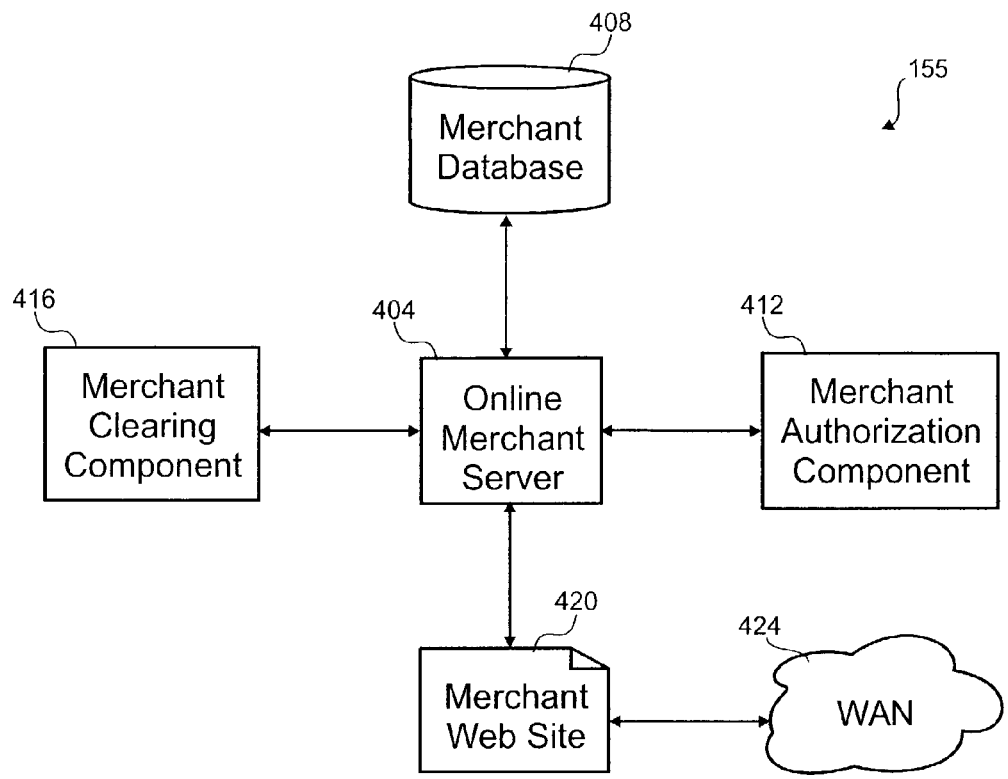
FIG. 4 is a block diagram of an embodiment of an online merchant.

With reference to FIG. 4, a block diagram of an embodiment of the online merchant system 155 is shown. An online merchant server 404, which could include one or more computers, manages operation of the merchant system 155. A merchant web site 420 runs on the online merchant server 404. Users interact with the merchant web site 420 by way of a wide area network (WAN) 424 to select goods and/or services for purchase. Those skilled in the art appreciate that the merchant server 404 could be one or more computers located in one or more locations where those computers are interconnected by some sort of network. Also, some blocks of the diagram could be combined into one as those skilled in the art appreciate. Further, other components of these and other blocks diagrams described in this specification could be so divided or combined.

The merchant web site 420 interfaces with a merchant authorization component 412 and a merchant clearing component 416 to integrate the functionality of the merchant system with the payment system 140. The merchant authorization component 412 communicates with the payment enabler 140 using the proper format, protocol, encryption and digital signatures during the authentication process where a payor 110 authorizes payment with the payment enabler 170. Communication during the clearing process is facilitated by the merchant clearing component 416 in a similar way. More specifically, the merchant clearing component 416 transports clearing files to the payment enabler 170 and receives settlement files from the payment enabler. Instead of passing files, the merchant can log into the payment enabler 170 or the merchant clearing component 416 can make automated queries on individual transactions.

Depending upon a business model of the online merchant 155, various information is stored in a merchant database 408. In this embodiment, digital IOUs, shipping addresses, user names, user passwords, past invoices, shipping status, and payment status is stored in the database 408. The payment status information may indicate where in the settlement process is a particular payment. For example, the payment status may indicate that a digital IOU was issued two days ago, a clearing file was submitted yesterday that presented a certain portion of the digital IOU and a settlement file today indicated the EFT had cleared that portion. In some circumstances, the merchant may wait for the EFT funds to clear before sending the goods and/or providing service to the user 110.

Figure 5:
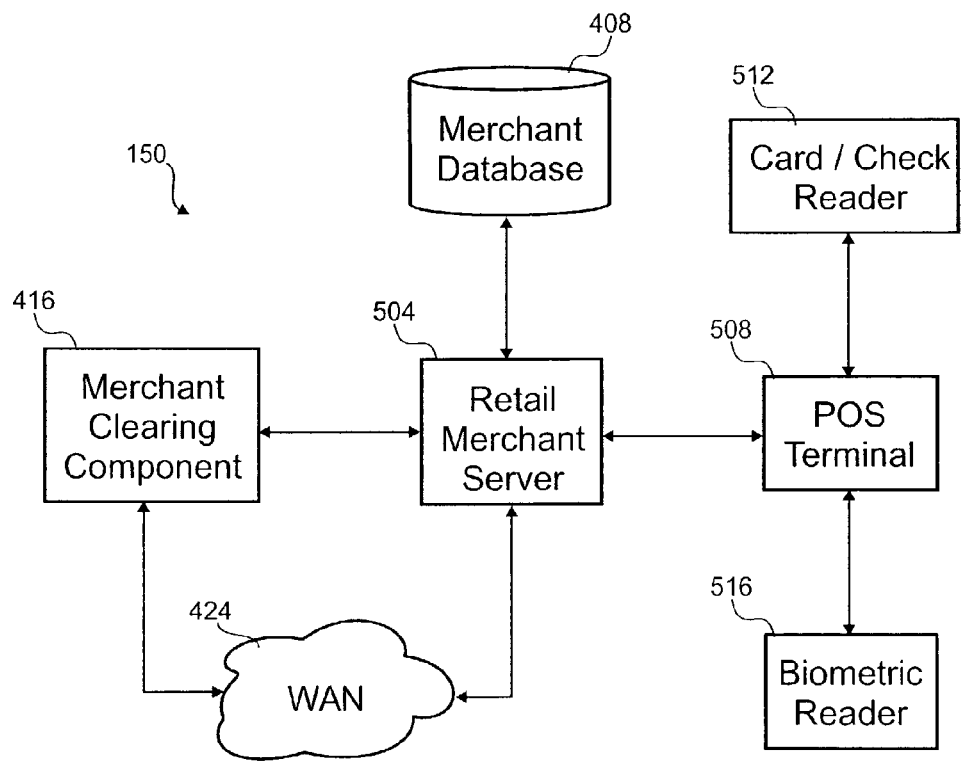
FIG. 5 is a block diagram of an embodiment of a retail merchant.

Referring next to FIG. 5, a block diagram of an embodiment of an retail merchant 150 is shown. The retail merchant 150 includes a retail merchant server 504, the merchant clearing component 416, the merchant database, a POS terminal 508, a card/check reader 512, and a biometric reader 516. Retail merchants typically include the POS terminals 508 to aid in checkout, but there is no reason why an online merchant couldn't work with a POS terminal that is coupled to the online merchant 155.

A store clerk typically operates a cash register that is coupled to the POS terminal 508. The user 110 typically interacts with the POS terminal to effectuate payment. Communication between the POS terminal 508 and the payment enabler 170 is relayed by the retail merchant server 504 through the WAN 424. The screens on the POS terminal 508 are formulated by the payment enabler 170. In some embodiments, the POS terminal 508 could use open network connectivity, such as the Internet, with web browsing software to connect with payment enabler 170 that formulates screens for display to the user 110.

Information gathered by the card/check reader 512 and the biometric reader 516 is processed by the POS terminal and relayed back to the payment enabler 170 for analysis. The card/check reader 512 can read account and routing information from checks and account information from cards. The card could have a one- or two-dimensional bar code, a magnetic stripe, a smart card chip, and/or a RF ID tag. In some cases, the card provides an account number that is used to retrieve other information from the payment enabler 170. For example, the card could include a user name or code representation of one to the card/check reader 512 that is passed to the payment enabler 170. Some embodiments could allow any card or check registered with the payment enabler 170 that is read to identify the user 110.

Once the user 110 is known to the money transfer system 100, that purported identity can be further verified. This embodiment uses a biometric reader to assist in this process. The biometric reader could read any portion of the user to confirm the purported identity by checking the biometric data against information stored in the user database 324. Some embodiments could use a soft keypad on the screen of the POS terminal 508 to allow entry of a PIN to confirm the purported identity of the user 110. Further, the POS terminal screen could allow entry of a signature on its screen that is passed back to the authentication processor for analysis.

In some cases, the possession of the card or check is the only authentication performed, but the biometric reader or the electronic screen signature could be stored in the user database 324. The biometric scan or signature could be used where the charge is later disputed. Where only one form of payment, such as a check or card, is presented and/or the user 110 is not registered with the payment enabler 170, a transfer could be limited to that form of payment for that transaction. Other embodiments could allow access to other accounts stored in the payment enabler 170 once the existence of one form of payment is demonstrated.

Figure 6A:
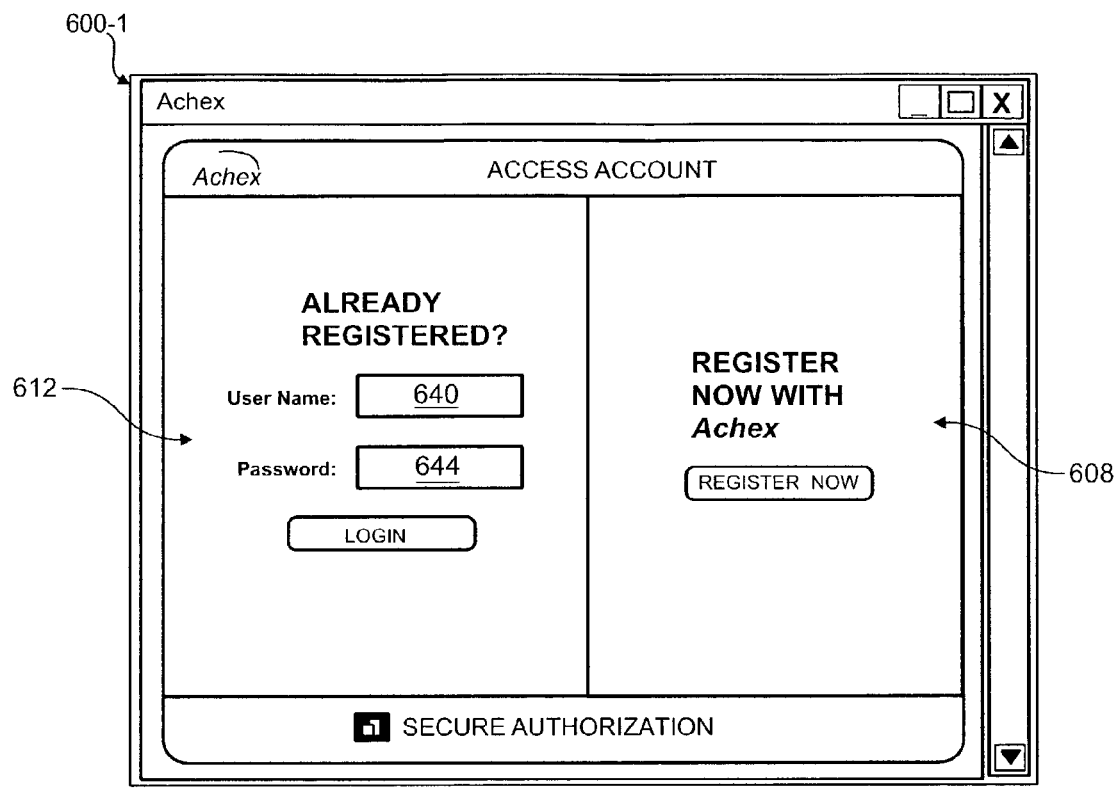
FIG. 6A is a screen shot of an embodiment of a checkout screen for an online transaction.

With reference to FIG. 6A, a screen shot of an embodiment of a checkout screen 600-1 for an online transaction is shown. In this embodiment, the user 110 accesses the online merchant 155 across a network. The checkout screen 600-1 could be activated at some point in the checkout process with the online merchant 155. The checkout screen 600-1 is typically in a window that overlays the window associated with the merchant such that when closed, the merchant's window is revealed.

The checkout screen presents a login portion 612 and a new account portion 608. Existing account holders enter their user name 640 and password 644 to authenticate their identity and login. A user 110 without an account uses the new account portion 608 to begin a registration process where handler, authentication and demographic information is entered.

Figure 6B:
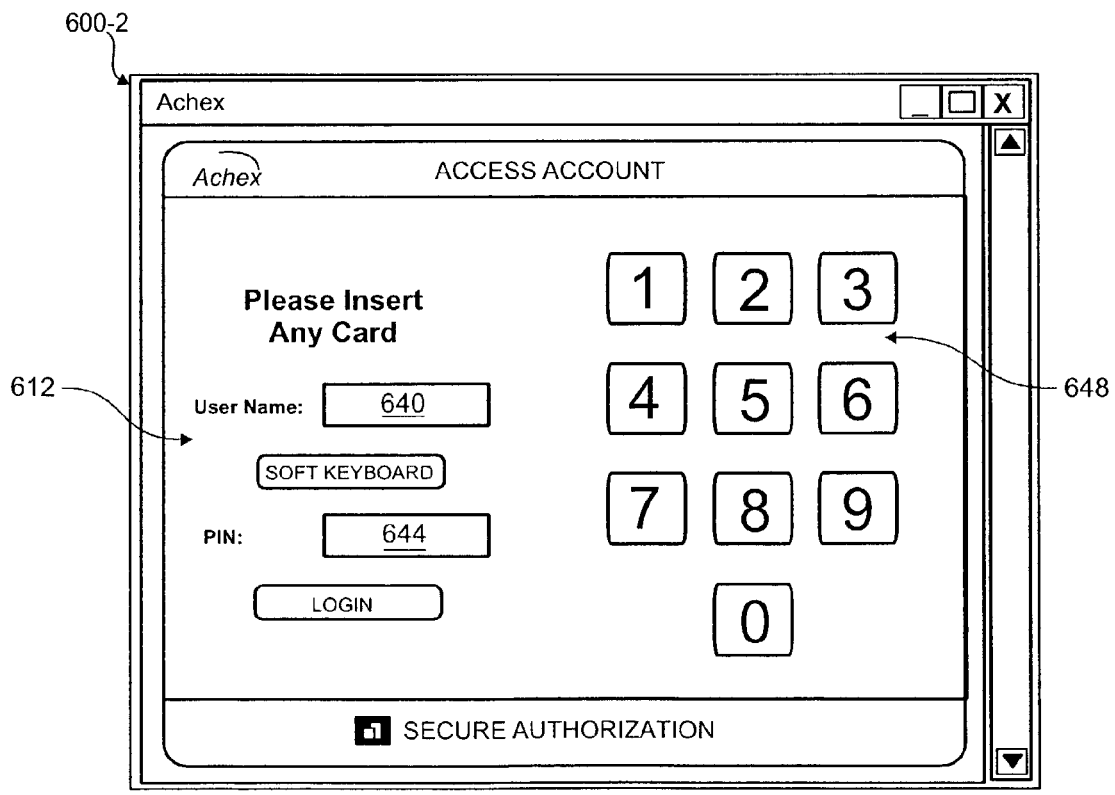
FIG. 6B is a screen shot of another embodiment of the checkout screen for a point of sale terminal with PIN authentication.

Referring next to FIG. 6B, a screen shot of another embodiment of the checkout screen 600-2 for a POS terminal 508 with on-screen PIN authentication is shown. In this embodiment, the user 110 presents their identity by inserting a card or check in the reader 512. The card or check may encode their name or account which can be crossed against information in the user database 324 to automated determine a user name. Alternatively, the user 110 could use a physical keyboard coupled to the POS terminal 508 or a soft keyboard superimposed on the POS terminal screen to enter a user name 640. A number pad 648 is used to enter the PIN 644.

Figure 6C:
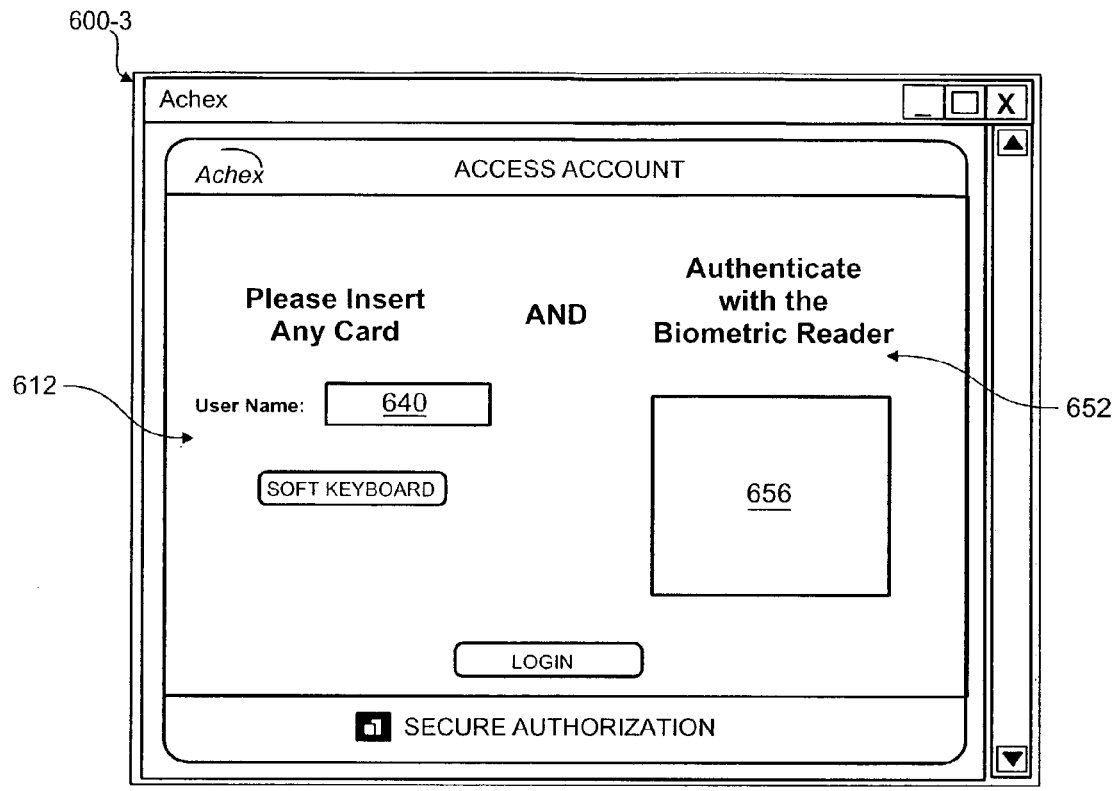
FIG. 6C is a screen shot of yet another embodiment of the checkout screen for a point of sale terminal with biometric authentication.

With reference to FIG. 6C, a screen shot of yet another embodiment of the checkout screen 600-3 for a point of sale terminal with biometric authentication is shown. Once authenticated, the user 110 can access their existing account to authorize payment. In this embodiment, the user 110 has an ID, card, check, RF ID, etc. read by the POS terminal 508 that can be cross referenced with the user database 324 to a user name 640. Instructions 656 for using the biometric reader 516 are displayed in a biometric portion 652. These instructions 656 could be stored with the retail merchant 150 or with the payment enabler. When the biometric scan is performed, it is compared with information stored in the user database 324 in a one-to-one match. The authentication processor 335 informs the POS terminal 508 if there is a likely match before continuing to authorization of the transfer.

Figure 6D:
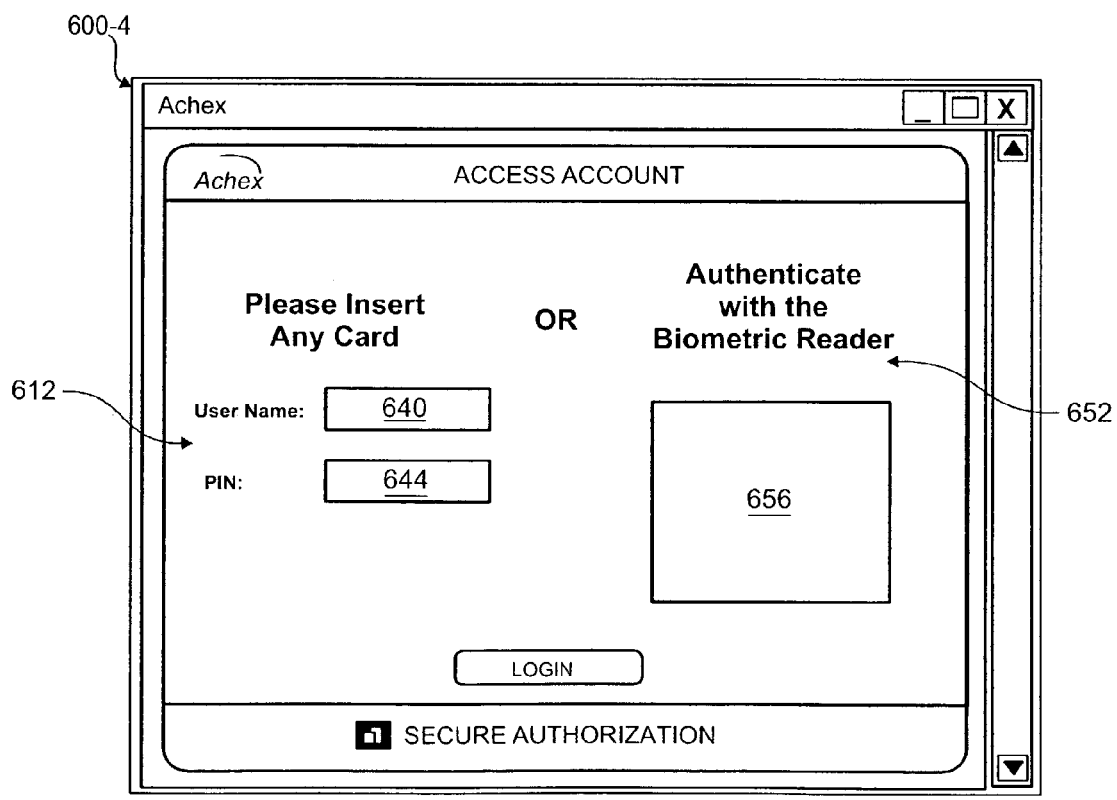
FIG. 6D is a screen shot of still another embodiment of the checkout screen for a point of sale terminal with biometric authentication or PIN authentication.

Referring next to FIG. 6D, a screen shot of still another embodiment of the checkout screen 600-4 for a point of sale terminal with biometric authentication or PIN authentication is shown. If a card, check, ID, etc. is recognized by the reader 512 in the login portion 612, the biometric portion 652 is replaced by a number pad 648 to enter a PIN 644 for authentication. Alternatively, a scan with the biometric reader 516 can be used for a one-to-many search of the user database 324 to determine with the authentication processor 335 which user 110 is currently attempting to use the system 100. By using the biometric reader 516, the user 110 can authenticate with himself or herself to access their account with the payment enabler 170 without providing any documentary authentication, such as a card, check or ID.

Figure 7A:
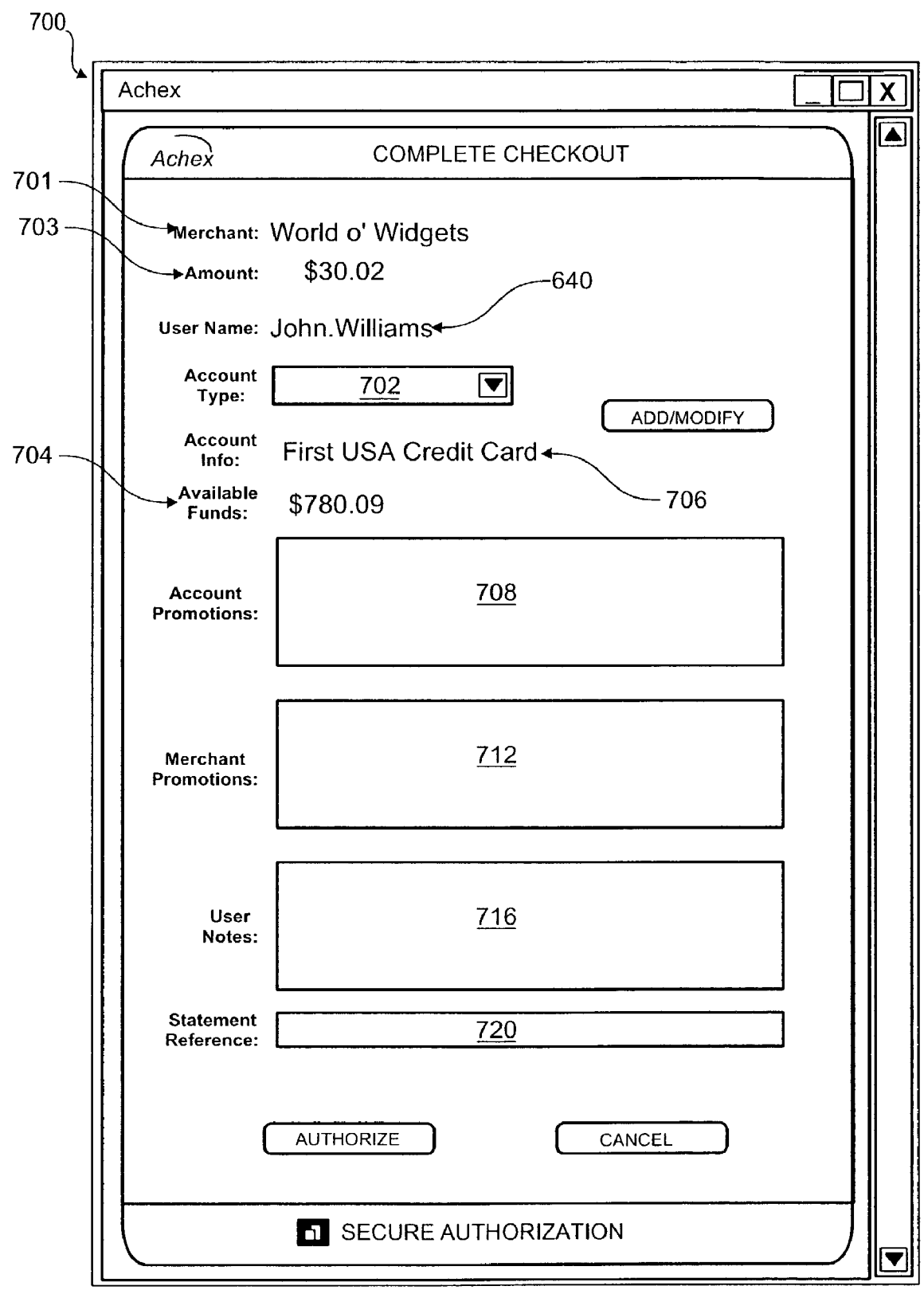
FIG. 7A is a screen shot of an embodiment of an authorization screen for an online purchase with a registered user.

With reference to FIG. 7A, is a screen shot of an embodiment of an authorization screen 700 for an online purchase with a registered user 110 is shown. Once the user 110 has authenticated their identity in any of the various ways described above, the authorization screen 700 can be presented with an authenticated user name 640. The merchant name 701 is shown along with the amount 703 of the transaction. Some embodiments could itemize the items being purchased along with tax, shipping, etc. on the authorization screen 700. These line items are passed by the merchant 150, 155 to the payment enabler 170 for possible inclusion in the authorization screen 700.

The user 110 may only have one account registered with the payment enabler 170 or be otherwise limited to one account during checkout. Where more than one account is possible, an account pull-down field 702 allows selection of those different accounts. The user 110 can optionally add or modify accounts. For a selected account, account information 706 and an available funds field 704 is populated. For different money handlers 160, this field 704 has a slightly different meaning. For a credit card, the available funds field is the available credit 704 before reaching any credit limit. The cash balance of a bank account is the available funds field 704 were the bank handler 160-5 or a debit card handler 160-3 is selected. For a gift certificate handler 160-6 or promotion handler 160-1, the available funds 704 is the remainder of the credit or point-equivalent credit remaining in that account. If the stored value fund with the payment enabler 170 is selected, that balance is used as the available funds field 704.

For the selected account 616, the promotions offered by the corresponding handler 160 for that account are shown in an account promotions field 708. This could include such things as cash back percentage discounts, sweepstakes, promotional points, warranty extension, insurance, etc. that are offered for the account. Additionally, the merchant may have promotions for the account or general promotions applicable to all forms of payment. The merchant promotion field 712 displays those promotions. The account and merchant promotion fields 708, 712 may have text, hyperlinks and/or images that describe any rules to the promotion.

A user note field 716 displays additional information. This field 716 is customizable before the transaction or by interacting with the authorization screen 700. The user note field 716 is tied to the account chosen. Warnings, issues, preferences, or any other information could be entered into this field 716. For example, the user may enter a note, such as, "only use for business expenses" or any other reminder relevant to the selected account.

A statement reference field 720 displays a string of characters that will be passed to the relevant handler 160 for inclusion on any statement for that account. Portions of that reference field 720 may be modifiable by the user 110. The handler 160 may choose to modify the statement reference field 720 in some way, but in some cases, the field appears on the statement as displayed on the authorization screen 700. Once the user 110 is satisfied with the information on the authorization screen 700, the authorization button is selected to authorize payment.

Figure 7B:
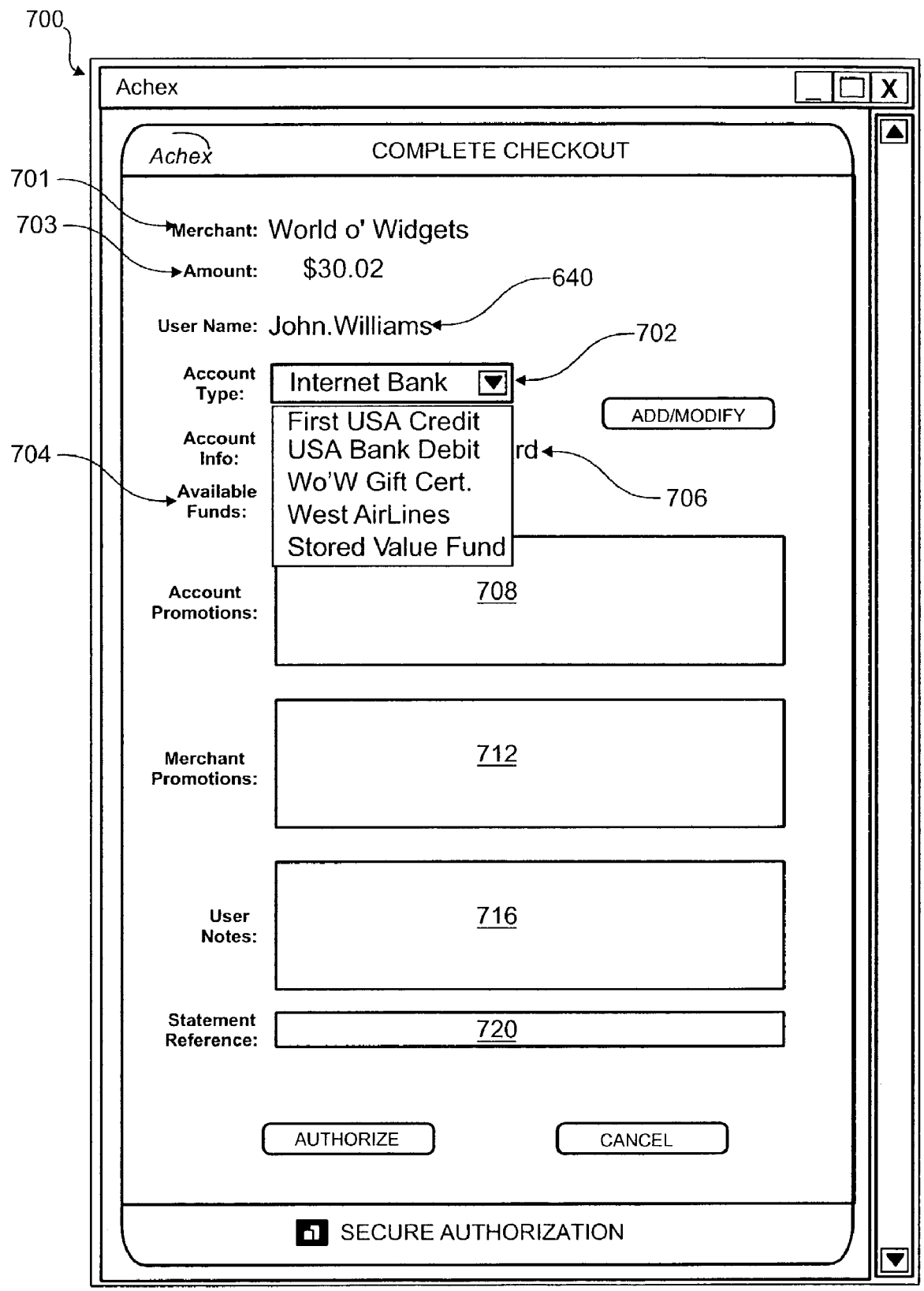
FIG. 7B is a screen shot of another embodiment of an authorization screen for an online purchase with a registered user.

With reference to FIG. 7B, is a screen shot of another embodiment of an authorization screen 700 for an online purchase with a registered user 110 is shown. This embodiment shows a drop-down list for the account type 702. The various accounts available are prioritized according to some scheme. The user 110 or merchant 150, 155 could prioritize these accounts. Some embodiments could allow the merchant prioritization to replace any user prioritization; only allow the merchant prioritization where the user 110 has not specified one; or, only allow the user prioritization to replace the merchant prioritization where the merchant 150, 155 has not specified one. The merchant 150, 155 could eliminate some types of accounts from being displayed as possibilities.

Figure 8A:
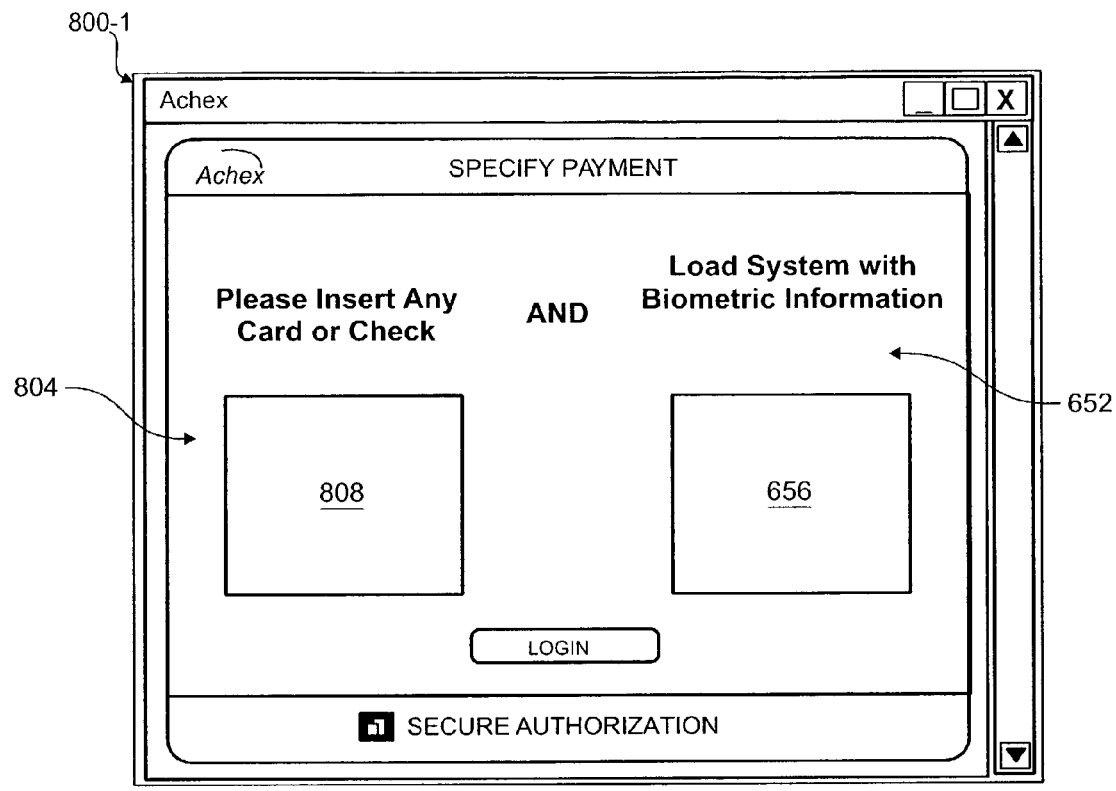
FIG. 8A is a screen shot of an embodiment of the checkout screen for an in-person purchase where the user may not be registered.

Referring next to FIG. 8A, a screen shot of an embodiment of the checkout screen 800-1 for an in-person purchase is shown where the user 110 may not be registered. The checkout screen 800-1 includes an account entry portion 804 and a biometric portion 652. The user 110 follows instructions 808 on the account entry portion 804 for entering some machine readable payment information with the card/check reader 512. Some embodiments could allow entry of account information manually. Once the account information is gathered and sent to the payment enabler 170 an account accessible with that same account information is created. The user 110 interacts with the biometric reader 516 according to instructions 656 to submit biometric information. This biometric information could be compared against past biometric information that was stored in the user database 324 for a previous transaction. Transactions that fail a comparison could result in denial of the transaction or a request for further information from the user 110. If there is nothing to compare against, the biometric information is stored in case the transaction is later disputed.

Figure 8B:
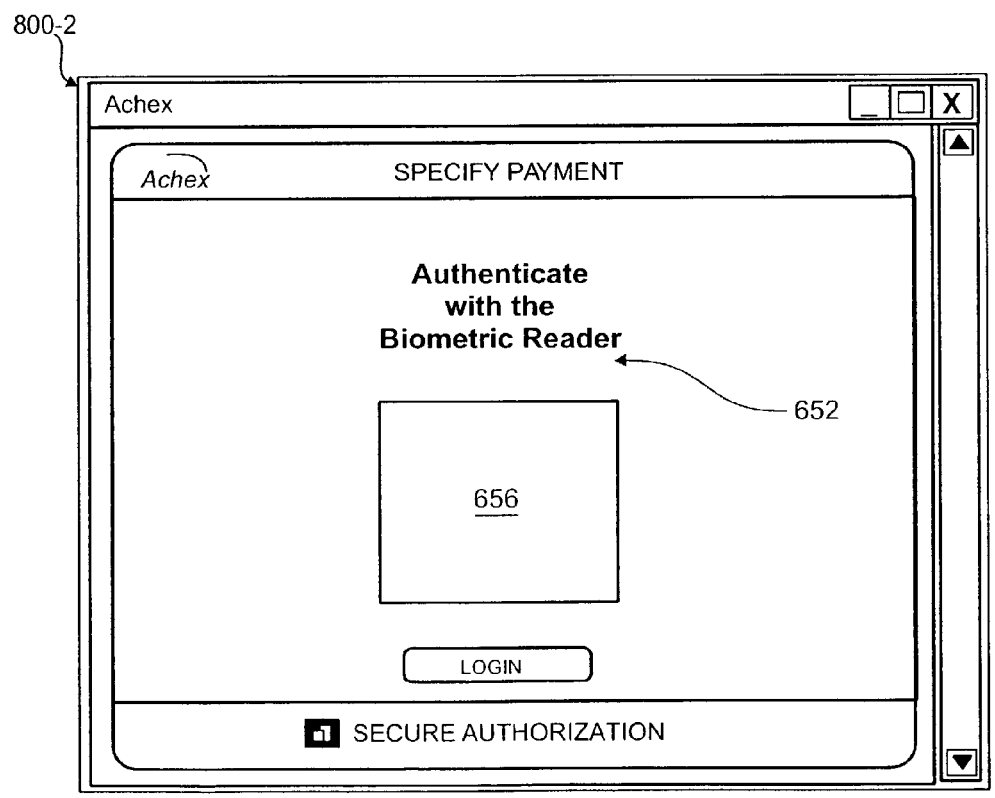
FIG. 8B is a screen shot of another embodiment of the checkout screen for an in-person purchase where user accesses previous payment information with biometric authentication.

With reference to FIG. 8B, a screen shot of another embodiment of the checkout screen 800-2 for an in-person purchase is shown where user 110 accesses previous payment information with biometric authentication. An account could be configured with the merchant 150 beforehand or account information may have been entered in a previous encounter. After the biometric reader 516 gathers information, the authentication processor 335 does a one-to-many comparison to authenticate the user 110 and access account information.

Figure 9A:
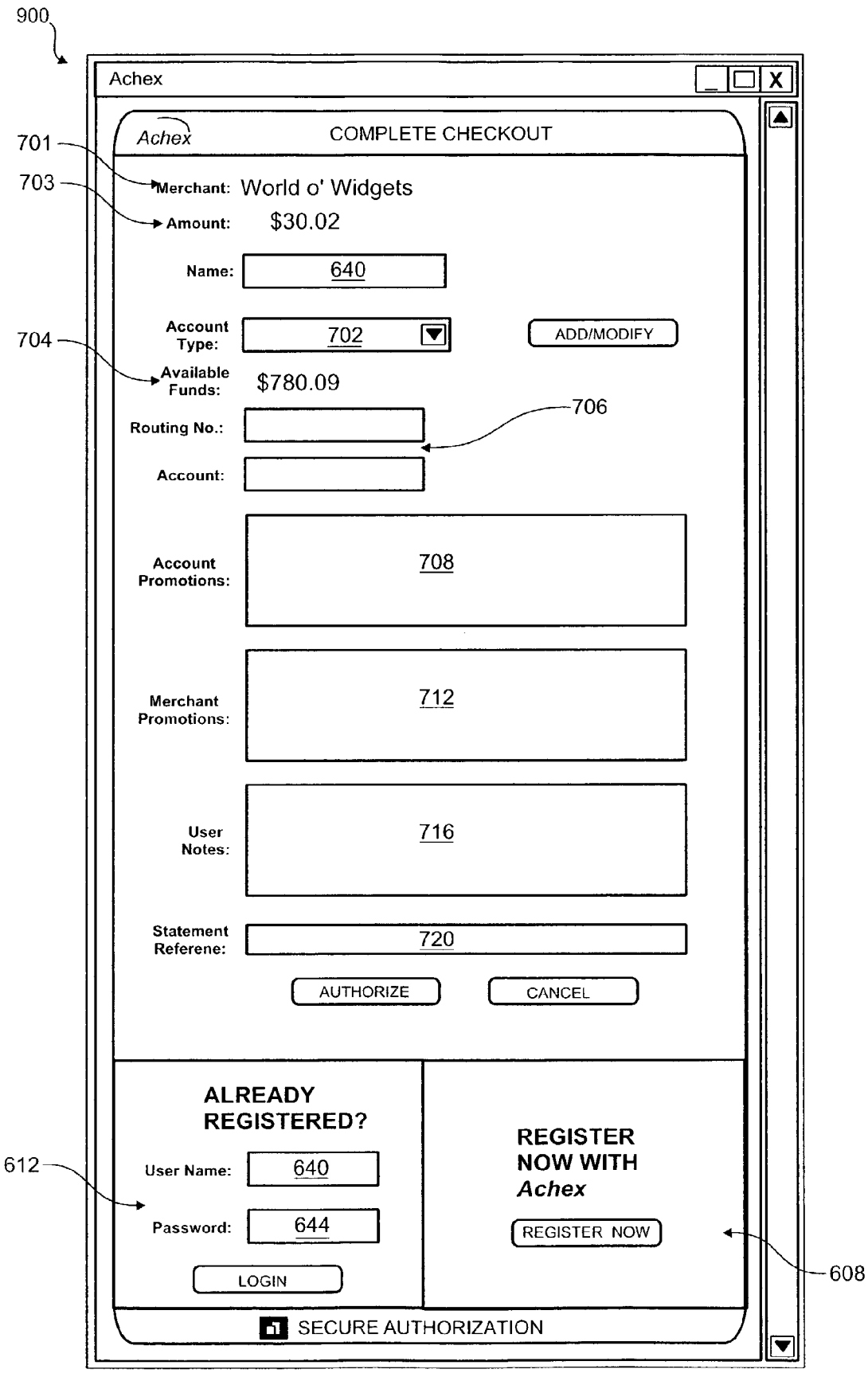
FIG. 9A is a screen shot of an embodiment of the authorization screen for a purchase with a potentially non-registered user.

Referring next to FIG. 9A, a screen shot of another embodiment of the authorization screen 900 for a purchase with a potentially non-registered user is shown. The purchase could be with an online merchant 155 or a retail merchant 150. Prior to getting to the authorization screen 900, the user 110 has authenticated herself with a card/check reader 512 and/or biometric reader 516 connected to a POS terminal or other computing device, for example, a personal computer, kiosk, mobile phone, a personal digital assistant, etc. In this embodiment, the user 110 has selected a bank handler account type 702 such that the account information 706 includes a bank routing number and account. Account notes 716 can be entered during checkout for the next checkout.

Where an account is not formally opened, information gathered during checkout is stored, but opening an account allows further options. A login portion 612 and a new account portion 608 of the authorization screen 900 are provided to allow logging into an existing account or creating a new account. Associating a checkout session with an account allows the user 110 to later log into the payment enabler 170 to view information on that transaction along with any other transactions associated with her account.

Figure 9B:
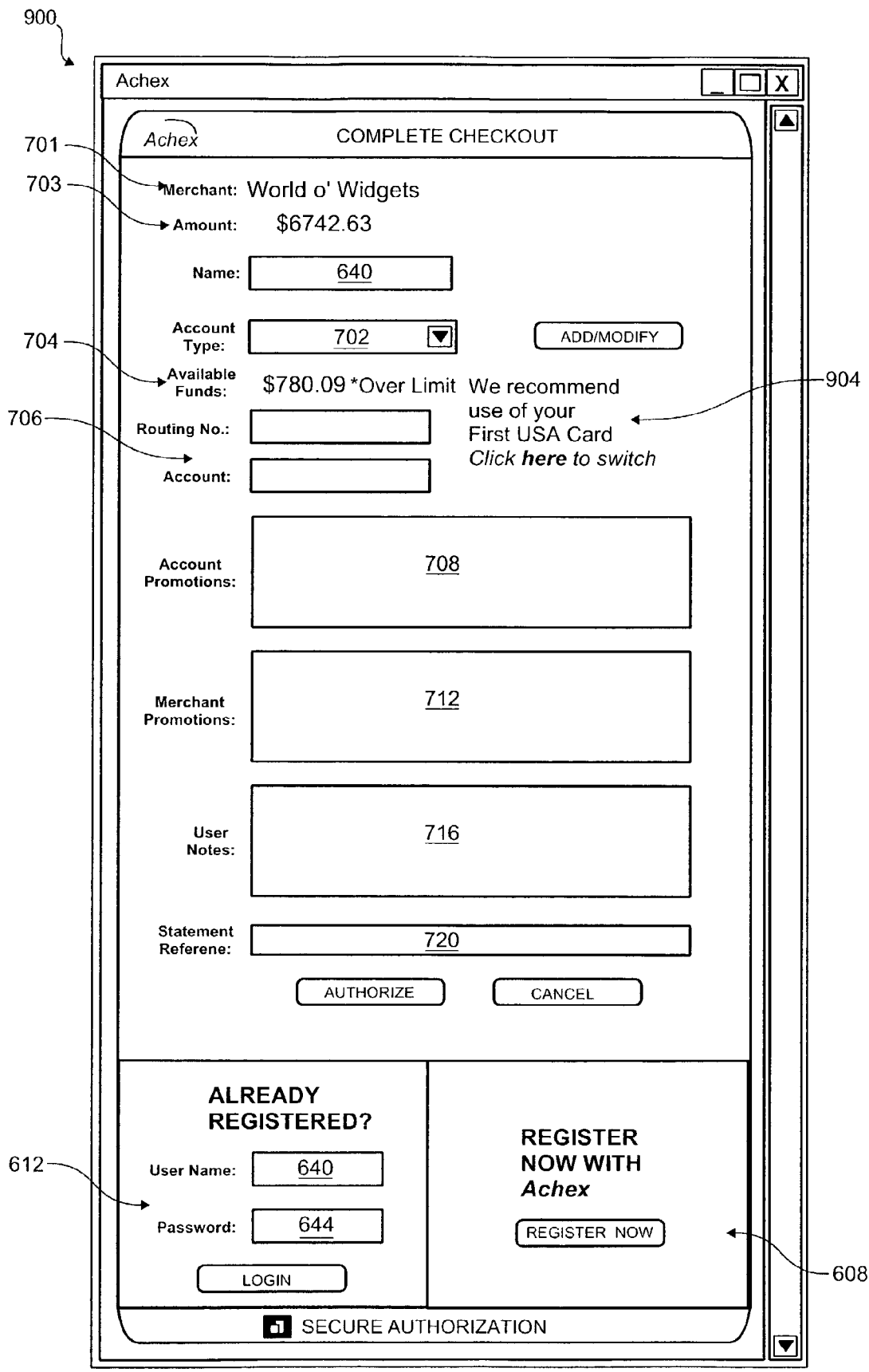
FIG. 9B is a screen shot of another embodiment of the authorization screen for a purchase with a potentially non-registered user.

Referring next to FIG. 9B, a screen shot of another embodiment of the authorization screen 900 is shown. In this embodiment, the purchase amount 703 exceeds the available funds 704 of the selected account 702. An error message 904 is presented that notes the selected account cannot support the current payment. Optionally, the merchant 150, 155 suggest a specific alternative chosen from the other accounts of the user 110. In this example, the merchant 150, 155 suggests use of the First USA Card in the error message 904. In some cases, the merchant 150, 155 could suggest a category of accounts, such as use of a VISA™ card.

In some cases, the chosen account appears adequate for the purchase, but is later rejected. For example, the handler 160 may not support providing limit information. Where the account is rejected after authorization, the authorization screen 900 can be represented with a suggestion for another account.

Other embodiments could preemptively suggest alternative accounts and special incentives associated therewith before the suggested account is selected for payment even though the presently selected account is adequate for the current purchase. For example, the merchant may note that a different credit card would receive enhanced fraud protection despite the user beginning to choose a bank account for authorization. A message could be presented on the authorization screen that notes the other credit card account may be preferable to the bank account. The merchant could limit the suggestions to those payment types that the user 110 had configured with the system 100. In other words, if the user 110 did not have the alternative account available, it would not be suggested. Some embodiments could check to confirm that the alternative account is not only available, but has sufficient limits for the current transaction before suggesting it as an alternative.

Figure 10A:
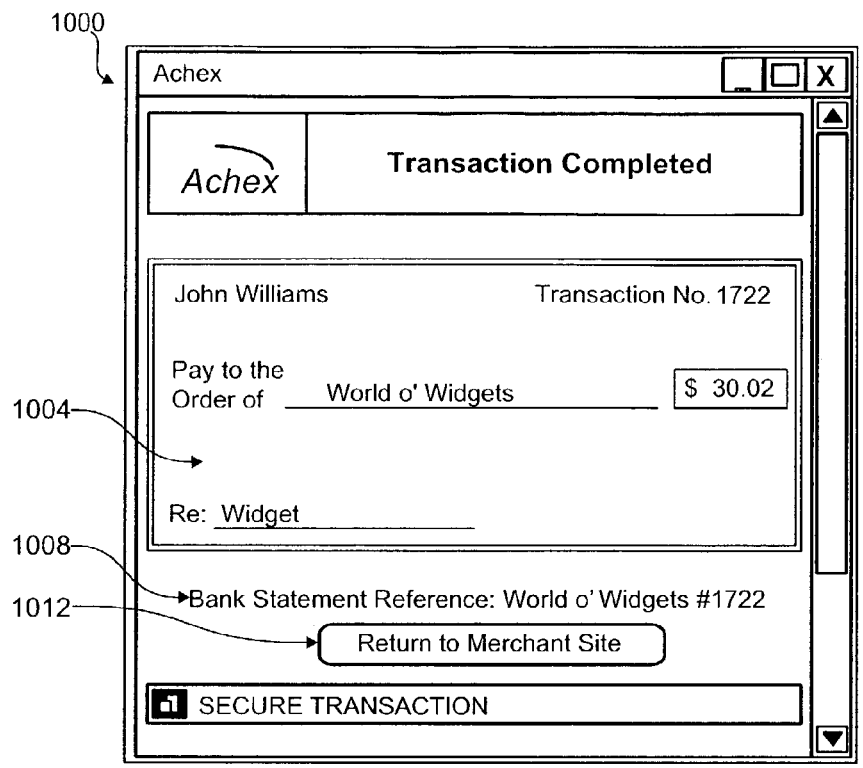
FIG. 10A is a screen shot of an embodiment of an electronic check confirmation window.

With reference to FIG. 10A, a screen shot of an embodiment of a confirmation window 1000 is shown. The confirmation window 1000 in this embodiment uses a check metaphor to confirm the withdrawal of funds from the user's bank account using the bank handler 160-4. After the user 110 successfully approves the transaction with the authorization window 700, 900, the confirmation window 1000 is presented to the user 110. A check pictogram 1004 is presented in the confirmation window that includes the memo field on the "Re:" line, the merchant name, the amount, the user name, and a transaction number in a manner similar to a traditional paper check. Below the check pictogram 1004 is a bank statement reference 1008, which is passed in a field in the ACH file that is used to perform the transfer. Some banks can put this bank statement reference 1008 on the statements of the user and/or merchant such that the transaction is readily identifiable from the statement.

Once viewing of the confirmation window 1000 is complete, the "return to merchant site" button 1012 may be activated by the user. In this embodiment, activation of that button 1012 closes the confirmation window 1000 to reveal an underlying window associated with the merchant 150, 155. In other embodiments, a script customized for the merchant is activated upon clicking the return button 1012. This script could redirect the confirmation window back to the merchant site such that an underlying merchant window is unnecessary. In some embodiments, the script could pull up an advertisement or any other task capable of being scripted upon activation of the button 1012.

Figure 10B:
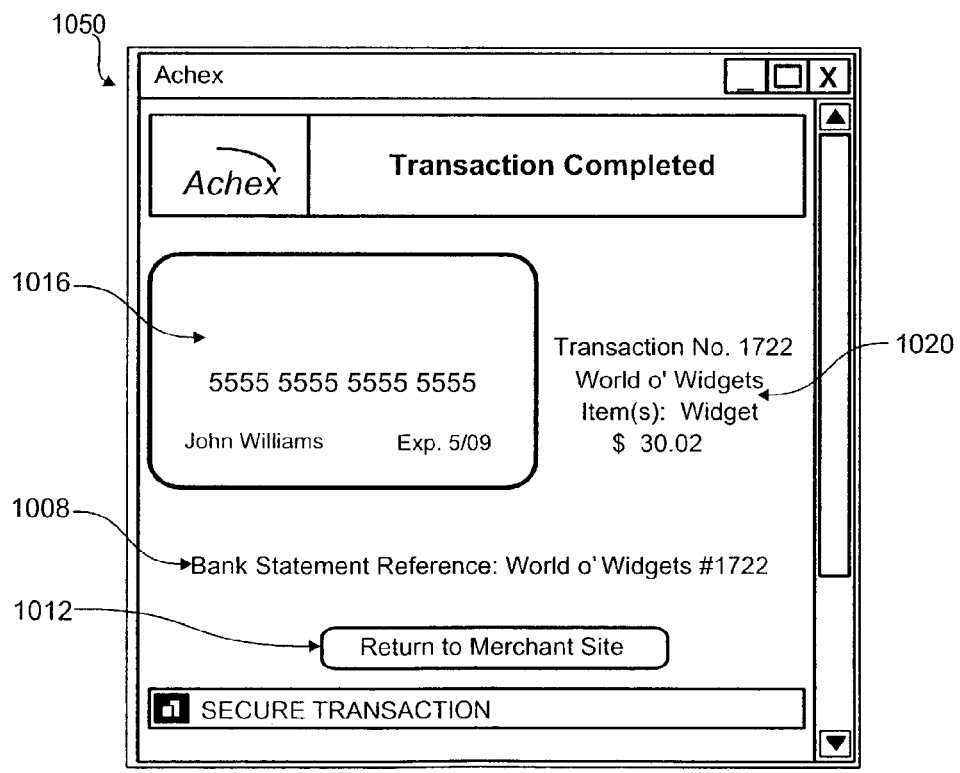
FIG. 10B is a screen shot of an embodiment of a card confirmation window.

Referring next to FIG. 10B, a screen shot of an embodiment of a card confirmation window 1050 is shown. In the card confirmation window 1050, transaction information 1020 is shown along with a credit card pictogram 1016. The pictogram 1016 depicts the charge or debit card chosen to fund the transfer using a familiar plastic card metaphor. A card statement reference 1012 is shown in the confirmation window 1050 that matches an identifier that will appear on the user's card statement and the merchant's bank statement. Some embodiments could have the merchant's statement depict other information such as an order number, a customer name, a customer number, an invoice number, etc.

Figure 11A:
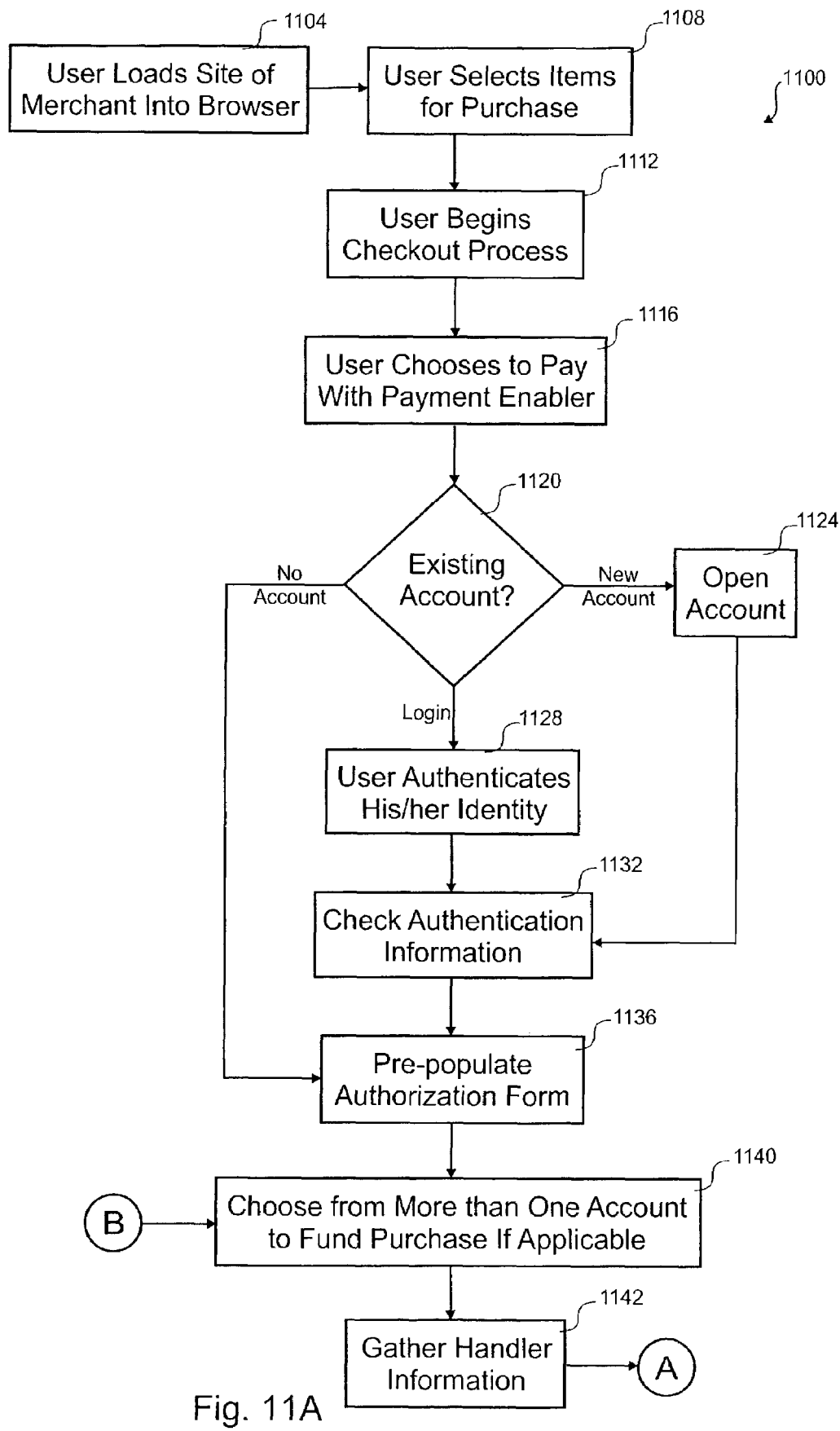
FIGS. 11A and 11B are a flow diagram of an embodiment of a process for performing an online purchase.
Figure 11B:
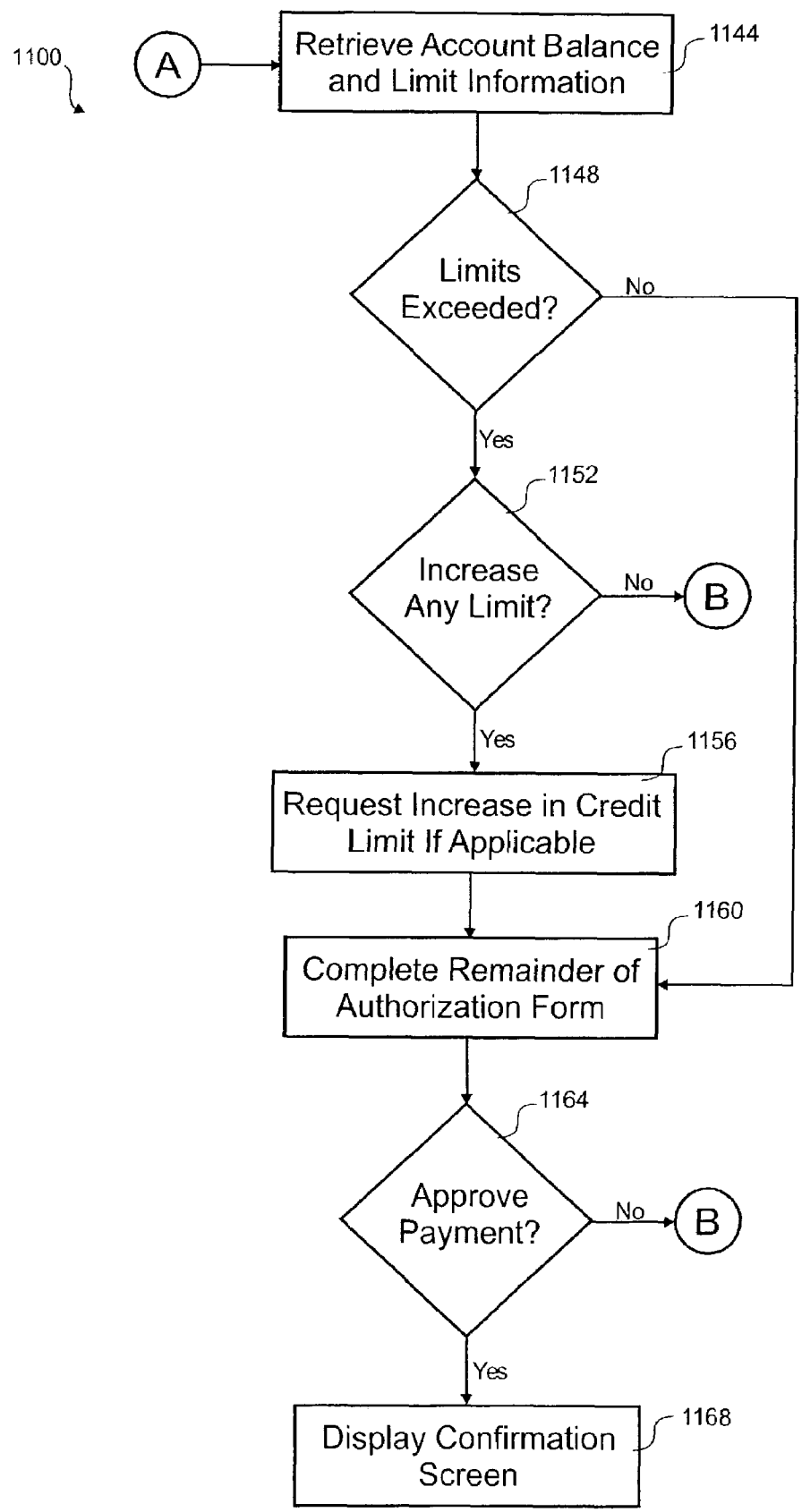

With reference to FIGS. 11A and 11B, a flow diagram of an embodiment of a process 1100 for performing an online purchase is shown. In step 1104, the user 110 loads up the online merchant 155 web site with the user interface 180. Items are selected for purchase from the online merchant 155. After all items are selected for purchase, the user 110 begins the checkout process in step 1112. The online merchant 110 could have a merchant account or other means to accept payment other than through the payment enabler 170. This embodiment presupposes that the user 110 selects the payment enabler 170 to pay for the items in step 1116.

In step 1120, the user 110 may have an account or not. If the user 110 wishes, she can open an account in step 1124 before proceeding to step 1132. As part of the account creation process, the user 110 authenticates her identity. Where an account exists, the user 110 logs into the payment enabler 170 in step 1128 to authenticate her identity. In step 1132, the authentication information is checked by the authentication processor 335. The checking may include verifying manually or machine entered account and identification information and any biometric processing. The authorization screen 700 is pre-populated with information from the user database 324 and/or information from the online merchant 155.

This embodiment allows the user 110 to pay without opening an account with the payment enabler 170. The user 110 may be given this option or the merchant could force this option in various embodiments. Where no account is created, the user 110 typically enters the payment information for each checkout. The payment enabler 170 could optionally track use of a particular form of payment and its use with the payment enabler 170 if it chose to. Any information passed from the online merchant 155 to the payment enabler 170 can be used to pre-populate the authorization screen 900 in step 1136.

The registered and non-registered user 110 can choose the money handler 160 to use in an account type field 702. In some embodiments, the user 110 and/or merchant 155 could limit the options available. For example, the merchant 155 could limit payment with the payment enabler 170 to the bank handler 160-4 only. With a registered user 110, any stored handler information is retrieved from the user database 324 in step 1142. Unregistered users 110 re-enter the handler information for each checkout in step 1142.

Account balance and limit information for the selected account is retrieved in step 1144 to the extent possible and listed in the available funds field 704 of the authorization screen 700, 900. In some cases, the limit is not enough to cover the amount 703 from the present checkout process as determined in step 1148. Where the limit would be exceeded, processing continues to step 1152 where the user 110 can request an increase in credit, an overdraft, or personal loan where the account cannot complete the transaction because of a limit. Alternatively, the user can loop from step 1152 back to step 1140 to select another money handler 160.

Where the user wishes to use the current account, a credit limit increase can be requested in step 1156 in an automated fashion. This could be performed for a credit card by increasing the credit limit, for a bank account or debit card by requesting overdraft protection for the bank account, or for any other account by extending a personal loan to the user 110. These increases in limit can be performed by the user 110 interacting with one or more screens to enter any relevant information requested by the particular handler(s) 160 involved. Different screens would gather the various information required by the various handlers to increase a limit. For example, the user 110 could be offered a personal line of credit, which could be secured by the items being purchased. This line of credit could be branded and/or offered by the merchant 155.

Upon arrival at step 1160, the user 110 has found an account that could fund the transaction. An authorization screen 700, 900 is presented to the user 110 to possibly modify information, change accounts or authorize the transaction. The user can add notes into the notes field 716 of the authorization screen 700, 900. These notes could be applicable to the merchant 155 and/or the chosen money handler 160. Some embodiments could have separate fields for the merchant 155 and the chosen money handler 160 such that the comments were accessed when the merchant 155 or the money handler were used again by the user 110.

Where payment is not approved as determined in step 1164, processing can loop back to step 1140 to choose another account. Of course, the user 110 could exit from the checkout process at this point or any time before this point without being obligated to the transaction. Where the user approves the transaction in step 1168, a confirmation screen 1000, 1050 appropriate to the chosen money handler 160 is displayed in step 1168. The transfer is completed by the payment enabler 170 transferring money from the account of the user 110 to another account specified by the merchant 150, 155. In some cases, a fee is extracted from the money. Many payments to the merchant 150, 155 could be aggregated in some embodiments. Chargebacks, fraudulent transfers and disputed transfers may be paid by the merchant 150, 155 and/or payment enabler 170 in various circumstances. The transfer amount could pass directly from the user account to the merchant account in some embodiments instead of passing through an account of the payment enabler.

Figure 12A:
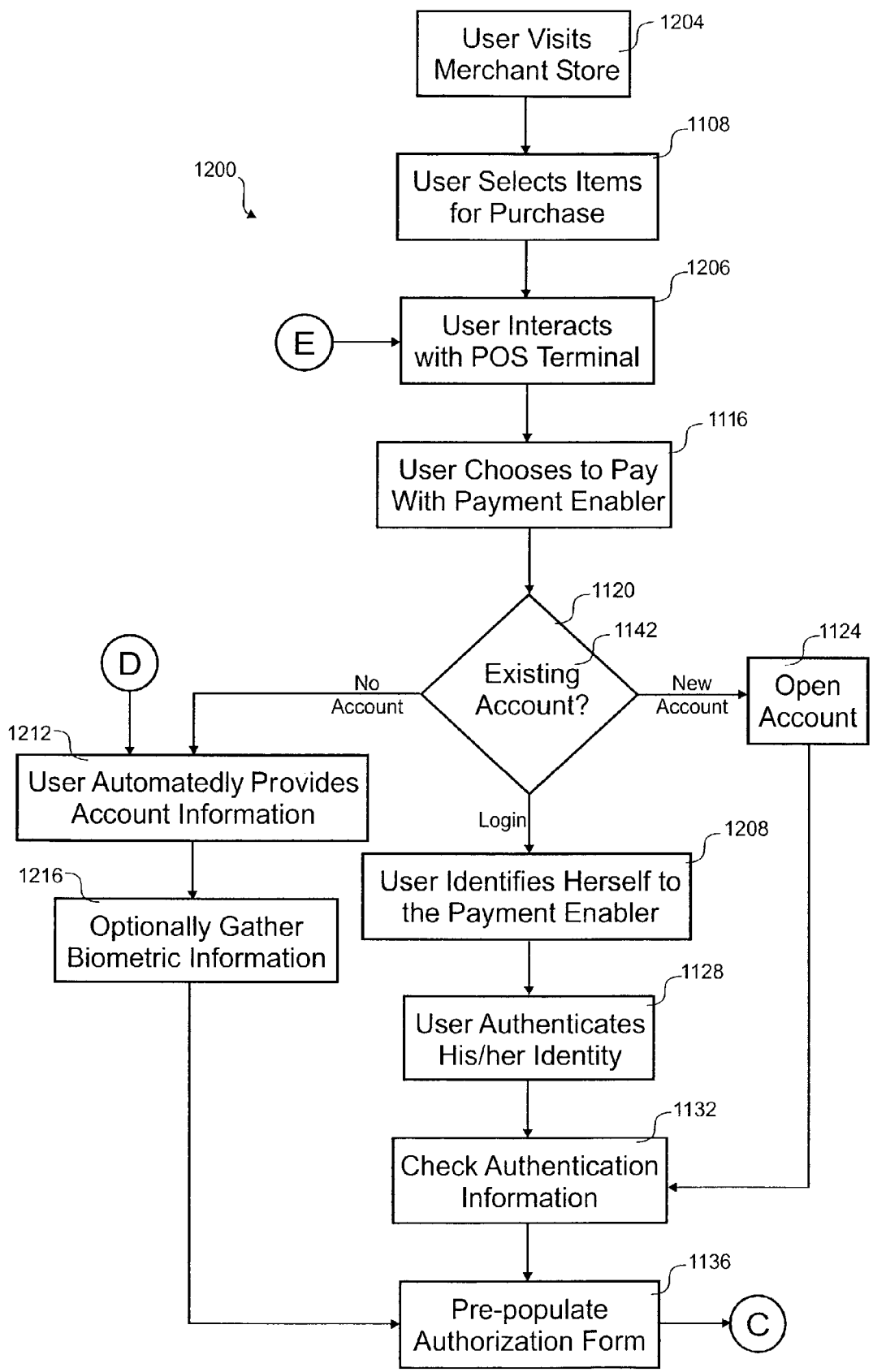
FIGS. 12A and 12B are a flow diagrams of an embodiment of a process for performing an in-person purchase at a POS terminal.
Figure 12B:
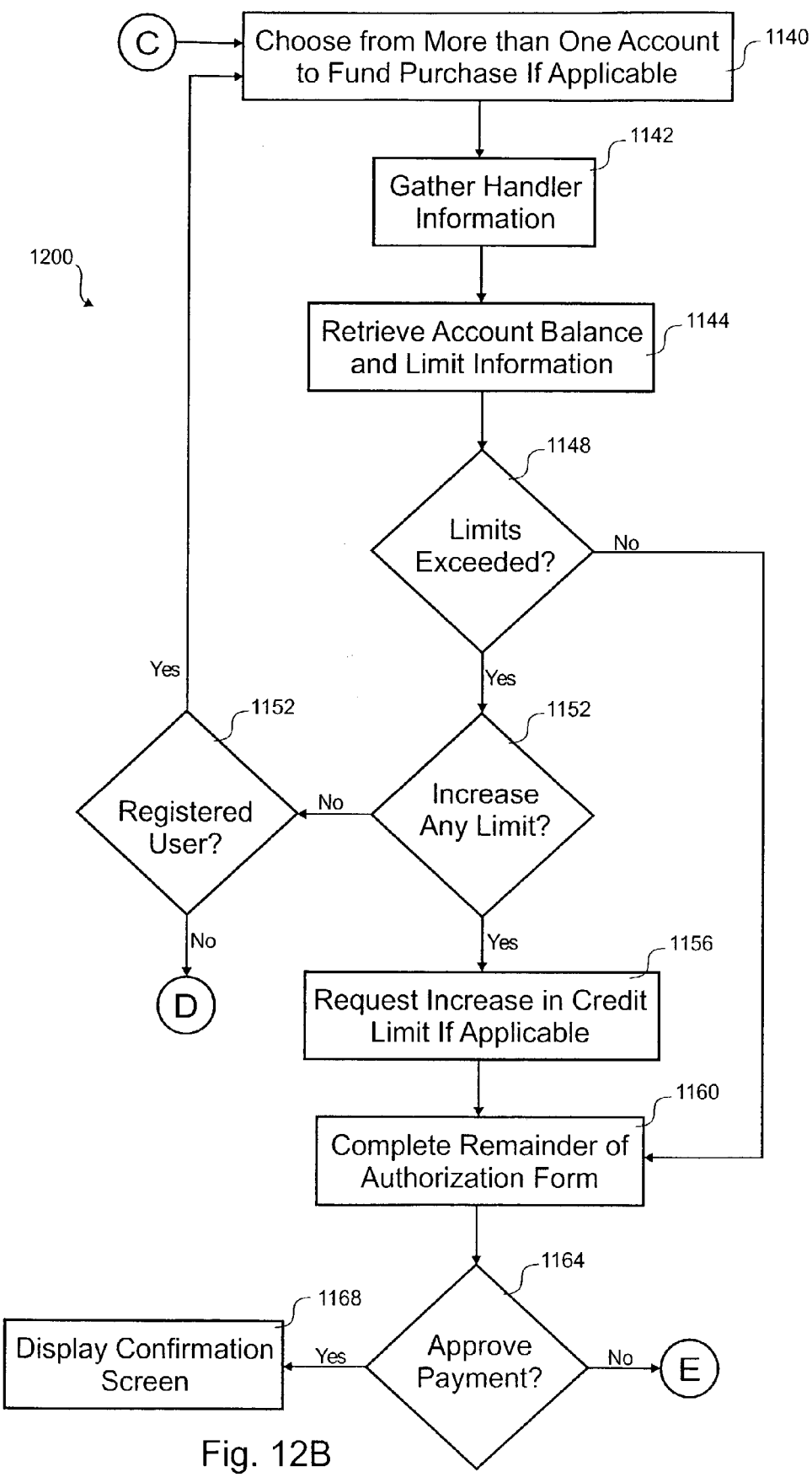

Referring next to FIGS. 12A and 12B, a flow diagram of an embodiment of a process 1200 for performing an in-person purchase at a POS terminal 508 or other interface at a retail merchant 150 is shown. The depicted portion of the process 1200 begins in step 1204 where the user visits the physical location of the retail merchant 150 and selects items for purchase in step 1108. In step 1206, the user 110 interacts with the POS terminal 508. A checkout clerk could assist in the checkout process.

In step 1116, the user chooses to pay through the payment enabler 170. Some embodiments may support only the payment enabler 170 or could support any number of payment alternatives. In step 1120, the users 110 divided between those without accounts or a desire to open one, those opening new accounts and those with existing accounts. Where the user 110 is presently unregistered and wants to open an account, processing continues to step 1124. A card/check reader 512 could be used to enter handler information and demographic information. A physical or soft keyboard could be used to augment this information. In some cases, a temporary user name and password could be issued to speed this process. A printer attached to the POS terminal 508 could print the account information for later reference. A card that is machine readable could be issued for pickup or mailing that includes the information to log into the system 100. Biometric information could be gathered during account creation to aid in future authentication. Once an account is opened and the identity of the user 110 is authorized during account creation, processing continues to step 1132.

This embodiment allows the user 110 to proceed configuring a transfer with payment enabler 170 without opening an account. In step 1212, the user 110 enters account and demographic information using the card/check reader 512 to the extent possible. For example, in a transaction using a credit card, the user 110 would have her card magnetic stripe and/or smart chip read to gather information for the credit card handler 160-2 to complete the transfer. In step 1216, biometric information could optionally be gathered by the biometric reader 516. Some users 110 may not want to provide biometric information and/or some retailers 150 do not support biometric readers 516. Any biometric information is stored with the transaction information in case of later disputes. Some embodiments could issue an automatically assigned account name and password for later logs into the system 100. Once the handler 160 and any biometric information is entered, processing continues to step 1136.

Where the user 110 has an existing account, processing continues from step 1120 to step 1208 where the user 110 identifies herself to the system 110. This could be through biometric recognition or automated reading of a card, check or identity card of the user 110. In step 1128, the user 110 authenticates her identity by collecting a PIN, password, biometric information, etc. In some cases, steps 1208 and 1128 are combined together, for example, when a card or biometric scan is used to identify and authenticate the user 110. A clerk could check an identity card provided by the user 110 or could check against a picture or signature provided from the user database 324 to manually authenticate the user 110 or to supplement automatic authentication. Some embodiments may rely upon automatic authentication unless there is a problem whereupon manual authentication is also performed.

In step 1132, the authentication information is checked for account holders. All users are next presented an authorization screen 700, 900 in step 1136. If the user 110 is registered, there may be more than one account available to fund the payment. A choice is made in step 1140 to determine the account of choice to use. The account information is retrieved from the user database 424 in step 1142. Account balance and any limits are retrieved in step 1144. A determination of whether any limit is exceeded is made in step 1148. Where the account is sufficient for the current transaction, processing continues to step 1160.

If the limit is reached as determined in step 1148, the account is insufficient to fund the transaction. The user 110 can choose to increase the limit or not in step 1152. Where the user does not want to increase the limit, processing continues to step 1152 where a further determination is made as to whether the user is registered. Unregistered users loop back to step 1212 and registered users loop back to step 1140.

Where the user 110 decides to increase the credit limit, it is requested in step 1156. In some cases, the limits cannot be increased such that the user 110 would have to choose another account anyway. In step 1160, the user completes the authorization screen 700, 900 with a credit limit available to sufficient for the purchase. In step 1164, the user can approve the payment or not. Where the user does not approve the payment, processing loops back to 1206 or abandons the purchase altogether. For an approved payment, a confirmation screen 1000, 1050 is displayed in step 1168.

Figure 13:
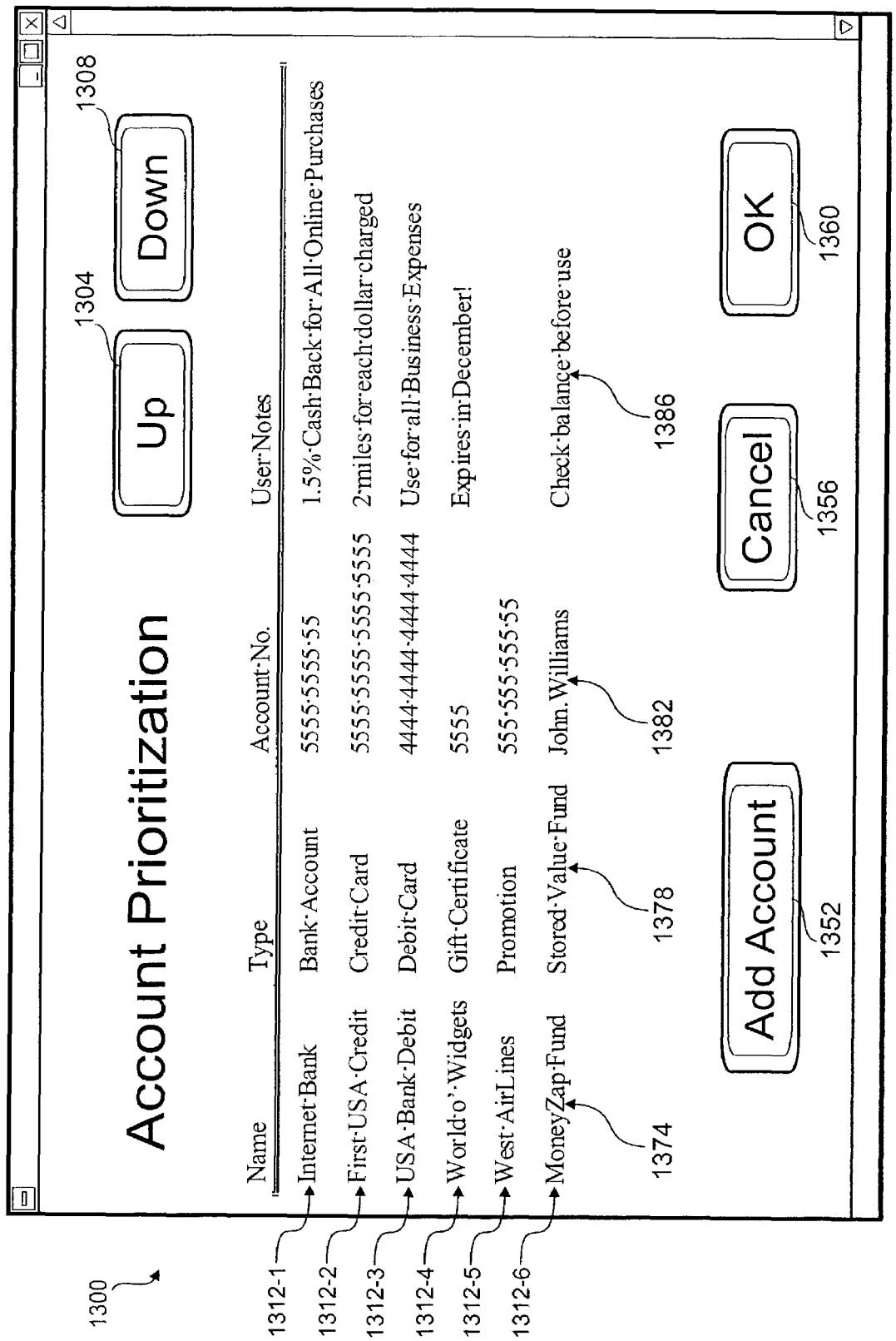
FIG. 13 is a screen shot of an embodiment of an account prioritization screen.

With reference to FIG. 13, a screen shot of an embodiment of an account prioritization screen 1300. Prioritization can be performed for each merchant 150, 155 or collectively performed for all merchants 150, 155 not individually specified. The accounts 1312 registered with the payment enabler 170 are listed. In this embodiment, there are six accounts 1312 registered. For each account, an account name 1374, an account type 1378, an account number or user name 1382, and user notes 1386 are listed. For example, the "USA Bank Debit" card account 1312-3 has the third-highest priority and the user 110 has added a note saying, "Use for all Business Expenses" that will appear when this account is chosen for payment.

The user 110 can activate a button 1352 to add more accounts. An up button 1304 and a down button 1308 allow moving the selected account 1312 respectively up and down in the priority ranking. Once the user has finished prioritization, an OK button 1360 accepts those changes. At any point during the prioritization process, the user 110 can activate a cancel button 1356 to leave the account prioritization screen 1300 without saving any changes.

The merchant 150, 155 could be presented with a similar screen to prioritize the various payment types. Various subcategories within each payment type could be also ranked. Some embodiments could rank the subcategories of all payment types with respect to each other. For example, bank accounts from ABC Bank may be ranked first and debit cards from ABC Bank ranked second. The merchant 150, 155 can also specify payment types or subcategories that will not be accepted.

Some embodiments could allow the merchant 150, 155 and/or user 110 sort the accounts based upon a selected criteria. For example, the merchant 150, 150 could prioritize the payment options based upon the cost of use to the merchant 150, 155 or advertising revenue to the merchant 150, 155. The user 110 could sort based upon largest discount, most promotional points, longest warranty extension, best insurance, best fraud protection, lowest interest rate, longest grace period, etc.

While the principles of the invention have been described above in connection with specific apparatuses and methods, it is to be clearly understood that this description is made only by way of example and not as limitation on the scope of the invention.

What is claimed is:

1. A method for a payor paying a payee using a payment account, the method comprising:

receiving selection at a point of sale (POS) terminal that a payor desires to use a payment enabler, wherein the POS terminal is located within a retail merchant;

the payment enabler retrieving, from a user database, information on a plurality of payment accounts that comprise a first payment account and a second payment account;

the payment enabler sending the first payment account and the second payment account to the POS terminal;

the POS terminal presenting the first payment account and the second payment account for selection by the payor;

the POS terminal receiving the selection of the first payment account;

the POS terminal sending the selection to the payment enabler;

before the payment is sent for authorization, the payment enabler determining the first payment account is inadequate in some respect to pay the payee;

in response to determining the first payment account is inadequate, the payment enabler suggesting a second payment account to the payor; and the payment enabler paying the payee with the second payment account.

2. The method for the payor paying the payee using the payment account as recited in claim 1, wherein the payment enabler is located remotely with respect to a payee, wherein the payment enabler stores the plurality of payment accounts for the payor.

3. The method for the payor paying the payee using the payment account as recited in claim 1, further comprising:

receiving one or more payee preferences to prioritize the plurality of accounts;

storing the one or more payee preferences as a prioritization scheme;

retrieving the prioritization scheme; and displaying the plurality of accounts according to the prioritization scheme.

4. The method for the payor paying the payee using the payment account as recited in claim 3, wherein the suggesting step comprises:

receiving one or more payor preferences;

storing the one or more payor preferences;

retrieving the payor preferences; and altering the display of the plurality of accounts according to the payor preferences.

5. The method for the payor paying the payee using the payment account as recited in claim 4, wherein the suggesting step comprises:

accessing payee preferences for which account the payee will accept;

determining which of the plurality of accounts is not accepted by the payee according to the payee preferences;

eliminating one or more of the plurality of accounts from the prioritized list, wherein the conflicting preferences are resolved in favor of the payee preferences; and displaying a change list having only accounts in the prioritized list that are accepted by the payee, wherein the accounts that are accepted by the payee are prioritized by the payor preferences.

6. The method for the payor paying the payee using the payment account as recited in claim 1, further comprising a step of receiving account information on the plurality of accounts from the payor.

7. The method for the payor paying the payee using the payment account as recited in claim 1, wherein the plurality includes at least one of the following:

a promotional program;
a coupon;
a credit card;
a debit card;
a bank account;
a brokerage account;
a credit from a retail location;
a stored value fund;
a gift certificate;
an entitlement;
electronic benefits;
tax refunds; and
government payments.

8. The method for the payor paying the payee using the payment account as recited in claim 1, wherein the determining step comprises steps of:

determining a limit that the first payment account can support;

determining if paying the payee from the first payment account would exceed the limit.

9. The method for the payor paying the payee using the payment account as recited in claim 1, wherein the paying step comprises steps of:

determining a first handler corresponding to the second payment account;

requesting at least an amount from the first handler;

receiving at least the amount from the first handler;

determining a third payment account chosen by the payee; and sending at least the amount to a second handler associated with the third payment account.

10. A method for a payor paying a payee using a payment account, the method comprising:

a payment enabler receiving one or more payor preferences, wherein one of the payor preferences is an incentive to sort a plurality of accounts;

the payment enabler receiving a purchase selection;

in response to receiving the purchase selection, the payment enabler retrieving information on a plurality of payment accounts that comprises the payment account, wherein the information comprises the payor preferences;

the payment enabler prioritizing the plurality of payment accounts according to the incentive provided in the retrieved payor preferences;

the payment enabler providing the plurality of payment accounts to the payor;

the payment enabler receiving selection of the payment account from the plurality of payment accounts;

in response to receiving selection of a payment account and before the payment is sent for authorization, the payment enabler determining the selected payment account is inadequate in some respect to pay the payee;

in response to determining the selected payment account is inadequate, the payment enabler suggesting a second payment account to the payor;

the payment enabler receiving authorization to send the payment with the second payment account to the payor; and the payment enabler transferring a payment from the payor to the payee with the second payment account.

11. The method for the payor paying the payee using the payment account as recited in claim 10, wherein the payment enabler is located remotely with respect to a payee, wherein the payment enabler stores the plurality of payment accounts for the payor.

12. The method for the payor paying the payee using the payment account as recited in claim 10, further comprising a step of providing a point of sale terminal located within a retail merchant and coupled to the payment enabler, wherein:

the point of sale terminal receives a list of the plurality of payment accounts;

the point of sale terminal displays the list for selection of the payment account by the payor; and the payment enabler transfers payment from the payor to the retail merchant with at least the payment account.

13. The method for the payor paying the payee using the payment account as recited in claim 10, further comprising steps of:

the payment enabler determining the payment account is inadequate in some respect to pay the payee; and the payment enabler suggesting another payment account of the plurality to the payor.

14. The method for the payor paying the payee using the payment account as recited in claim 10, further comprising:

the payment enabler determining that the payment account has insufficient funds before sending an authorization for payment; and the payment enabler suggesting an alternative payment account from the plurality that is different from the payment account.

15. The method for the payor paying the payee using the payment account as recited in claim 10, wherein the incentive includes at least one of the following:

cost of use to the payee;
cost of use to the payor;
largest discount;
most promotional points;
longest warranty extension;
best insurance;
best fraud protection;
lowest interest rate; and
longest grace period.

16. A method for a payor paying a payee using a payment account, the method comprising:

a payment enabler receiving a request to transfer payment from the payor to the payee;

the payment enabler retrieving information on a plurality of payment accounts that comprises the payment account and an alternative payment account;

the payment enabler determining the payment account to list first with respect to the plurality of payment accounts;

the payment enabler listing the plurality of payment accounts;

before sending an authorization for payment and in response to receiving the request, the payment enabler suggesting the alternative payment account that is different from the payment account; and the payment enabler transferring payment from the payor to the payee with at least one of the plurality of payment accounts.

17. The method for the payor paying the payee using the payment account as recited in claim 16, wherein the payment enabler is located remotely with respect to a payee, wherein the payment enabler stores the plurality of payment accounts for the payor.

18. The method for the payor paying the payee using the payment account as recited in claim 16, further comprising a step of providing a point of sale terminal located within a retail merchant and coupled to a payment enabler, wherein:

the point of sale terminal receives a list of the plurality of payment accounts;

the point of sale terminal displays the list for selection of the payment account by the payor; and the payment enabler transfers payment from the payor to the retail merchant with at least the payment account.

19. The method for the payor paying the payee using the payment account as recited in claim 16, further comprising steps of:

the payment enabler determining the payment account is inadequate in some respect to pay the payee; and the payment enabler suggesting another payment account of the plurality to the payor before the determining step.

20. The method for the payor paying the payee using the payment account as recited in claim 16, further comprising a step of the payment enabler prioritizing the plurality of payment accounts according to an incentive.

21. The method for the payor paying the payee using the payment account as recited in claim 16, further comprising a step of the payment enabler listing an incentive associated with the alternative payment account.

22. The method for the payor paying the payee using the payment account as recited in claim 16, further comprising steps of:

the payment enabler determining if the alternative payment account is acceptable to serve as payment; and the payment enabler avoiding the suggesting step based, at least in part, on the second-listed determining step.

* * * * *

UNITED STATES PATENT AND TRADEMARK OFFICE
CERTIFICATE OF CORRECTION

PATENT NO. : 7,571,140 B2  Page 1 of 1
APPLICATION NO. : 10/321275
DATED : August 4, 2009
INVENTOR(S) : Weichert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1564 days.

Signed and Sealed this

Seventh Day of September, 2010

David J. Kappos
*Director of the United States Patent and Trademark Office*